(12) United States Patent
Lu et al.

(10) Patent No.: US 12,492,764 B2
(45) Date of Patent: Dec. 9, 2025

(54) QUICK COUPLER

(71) Applicant: SHANGHAI VISION MECHANICAL JOINT CO., LTD, Shanghai (CN)

(72) Inventors: Zhigang Lu, Shanghai (CN); Zhibing Zhai, Shanghai (CN); Jun Wu, Shanghai (CN); Xubin Lu, Shanghai (CN)

(73) Assignee: SHANGHAI VISION MECHANICAL JOINT CO., LTD, Shanghai (CN)

( * ) Notice: Subject to any disclaimer, the term of this patent is extended or adjusted under 35 U.S.C. 154(b) by 208 days.

(21) Appl. No.: 17/841,219

(22) Filed: Jun. 15, 2022

(65) Prior Publication Data

US 2022/0307633 A1   Sep. 29, 2022

Related U.S. Application Data

(63) Continuation of application No. PCT/CN2022/074177, filed on Jan. 27, 2022.

(30) Foreign Application Priority Data

Feb. 7, 2021   (CN) .......................... 202110167603.0

(51) Int. Cl.
    *F16L 23/08*   (2006.01)
(52) U.S. Cl.
    CPC .................................. *F16L 23/08* (2013.01)

(58) Field of Classification Search
    CPC ......... F16L 23/08; F16L 21/065; F16L 17/04; F16L 23/04
    See application file for complete search history.

(56) References Cited

U.S. PATENT DOCUMENTS

| | | | | | |
|---|---|---|---|---|---|
| 2,923,561 | A | * | 2/1960 | Merrill | F16L 23/08 |
| | | | | | 285/337 |
| 3,464,722 | A | * | 9/1969 | Larkin | F16L 23/08 |
| | | | | | 24/284 |

(Continued)

FOREIGN PATENT DOCUMENTS

| | | |
|---|---|---|
| CN | 2161799 Y | 4/1994 |
| CN | 201582505 U | 9/2010 |

(Continued)

OTHER PUBLICATIONS

International Search Report and Written Opinion cited in PCT/CN2022/074177 dated Apr. 26, 2022, 5 pages.

(Continued)

*Primary Examiner* — Zachary T Dragicevich
*Assistant Examiner* — Fannie Kee
(74) *Attorney, Agent, or Firm* — Che-Yang Chen

(57) ABSTRACT

A quick coupler includes a top ring, a bottom ring and fasteners. The top ring may be engaged with the bottom ring to be assembled together; the top ring is provided with a top ring groove, and the bottom ring is provided with a bottom ring groove; the fasteners are loosely or tightly connected to the top ring and the bottom ring, so that the top ring and the bottom ring are fixed together as a whole; in a tight state, the top ring groove of the top ring and the bottom ring groove of the bottom ring are assembled to form an annular groove.

11 Claims, 24 Drawing Sheets

(56) References Cited

U.S. PATENT DOCUMENTS

| | | | | |
|---|---|---|---|---|
| 3,600,770 A | * | 8/1971 | Halling | F16L 23/08 285/411 |
| 3,661,409 A | * | 5/1972 | Brown | F16L 23/08 285/82 |
| 3,764,170 A | * | 10/1973 | Brown | F16L 21/065 285/368 |
| 4,191,410 A | * | 3/1980 | Voituriez | F16L 23/08 285/411 |
| 4,225,160 A | * | 9/1980 | Ortloff | F16L 23/08 285/408 |
| 4,341,406 A | * | 7/1982 | Abbes | F16L 23/08 285/411 |
| 4,408,788 A | * | 10/1983 | Beukema | F16L 23/08 285/112 |
| 4,488,744 A | * | 12/1984 | Bubeck | F16L 23/08 285/365 |
| 4,781,406 A | * | 11/1988 | Hubener | F16L 23/08 285/411 |
| 4,915,418 A | * | 4/1990 | Palatchy | F16L 23/08 285/411 |
| 5,707,089 A | * | 1/1998 | Fend | F16L 23/08 285/411 |
| 6,499,773 B1 | * | 12/2002 | Ostergaard | F16L 23/08 285/411 |
| 7,341,287 B2 | * | 3/2008 | Gibb | F16L 21/065 285/367 |
| 10,711,929 B1 | | 7/2020 | Lu et al. | |
| 10,797,372 B2 | * | 10/2020 | Hemmervall | F16L 23/08 |
| 11,808,388 B2 | * | 11/2023 | Emrick | F16L 23/08 |
| 2005/0212296 A1 | * | 9/2005 | Dole | F16L 23/08 285/420 |
| 2011/0154646 A1 | * | 6/2011 | Hagiya | F16L 23/08 29/505 |
| 2013/0185919 A1 | * | 7/2013 | Beagen, Jr. | F16L 23/08 285/337 |
| 2014/0132000 A1 | * | 5/2014 | Ben-Horin | F16L 21/065 285/373 |
| 2014/0333062 A1 | * | 11/2014 | Biery | F16L 23/08 264/261 |
| 2015/0176728 A1 | * | 6/2015 | Bowman | F16L 21/065 285/321 |
| 2020/0049285 A1 | * | 2/2020 | Lee | F16L 23/08 |
| 2020/0332934 A1 | * | 10/2020 | Duncan | F16L 23/08 |
| 2022/0186862 A1 | * | 6/2022 | Lu | F16L 23/08 |

FOREIGN PATENT DOCUMENTS

| | | | | |
|---|---|---|---|---|
| CN | 102644811 A | | 8/2012 | |
| CN | 202629425 U | | 12/2012 | |
| CN | 103867829 A | * | 6/2014 | F16L 21/065 |
| CN | 105508761 A | | 4/2016 | |
| CN | 105508762 A | | 4/2016 | |
| CN | 206377375 U | | 8/2017 | |
| CN | 207864855 U | | 9/2018 | |
| CN | 112212092 A | | 1/2021 | |
| CN | 113757461 A | | 12/2021 | |
| DE | 2100568 A1 | | 7/1972 | |
| DE | 102008058373 A1 | | 7/2009 | |
| EP | 0406597 A2 | | 1/1991 | |
| GB | 2550960 A | * | 12/2017 | F16L 23/08 |
| IT | 202000009817 A1 | * | 11/2021 | F16L 23/08 |
| JP | S5028638 U | | 4/1975 | |
| JP | S5973694 A | | 4/1984 | |
| JP | 2019525093 A | | 9/2019 | |
| KR | 200379822 Y1 | * | 3/2005 | F16L 23/08 |
| KR | 20110046903 A | * | 5/2011 | F16L 23/08 |
| KR | 101366184 B1 | * | 2/2014 | F16L 23/08 |
| KR | 101810507 B1 | | 1/2018 | |
| WO | WO-2009102698 A1 | * | 8/2009 | F16L 21/065 |
| WO | WO-2020045749 A1 | * | 3/2020 | F16L 21/065 |

OTHER PUBLICATIONS

Supplementary European Search Report received in corresponding European Patent Application No. 22749011.7, dated Mar. 18, 2024, 4 pages.

Office Action received in corresponding Japanese patent application No. 2023-547525, dated Sep. 24, 2024, 10 pages.

* cited by examiner

US 12,492,764 B2

QUICK COUPLER

CROSS-REFERENCE TO RELATED APPLICATIONS

This application is a continuation of PCT application No. PCT/CN2022/074177, filed on Jan. 27, 2022, which claims the priority and benefit of Chinese patent application No. 202110167603.0, filed on Feb. 7, 2021. The entirety of PCT application No. PCT/CN2022/074177 and Chinese patent application No. 202110167603.0 are hereby incorporated by reference herein and made a part of this specification.

TECHNICAL FIELD

The present application relates to a field of a quick coupler in particular, relates to a reusable quick coupler.

BACKGROUND ART

In the general production, during connecting and mounting the pipes and the fittings, a connector capable of fast assembly, i.e., quick coupler, is adopted in order to save time and energy. A conventional quick coupler realizes a connection by enlarging the local curvature radius of the housing thereof, so that via the deformation of the housing during mounting, the connecting key can be engaged in the groove of the pipe, the flange or the snapping ring of the pipe can be engaged in the groove, or the sawtooth of the connecting key can be embedded in the outer surface of the plain end pipe. However, this conventional quick coupler can only realize the fast assembly for one time, since the deformation of the housing causes the failure of the second fast assembly after this quick coupler is mounted once.

SUMMARY

The advantage of the present application is to provide a quick coupler, which can assemble the pipe and the fitting effectively and quickly.

Another advantage of the present application is to provide a quick coupler, which realizes a reusable fast assembly by a combined component structure.

Another advantage of the present application is to provide a quick coupler, in which the detachable structure facilitates the repairing and maintain this device.

The advantages and the features of the present application will be clearly explained in the following description, which can be achieved by the means and combinations in the appended claims.

In the present application, the advantages can be realized by adopting the following technical solution: a quick coupler includes a top ring and a bottom ring, in which a top ring groove of the top ring and a bottom ring groove of the bottom ring form an annular groove in the fastened state.

DETAILED DESCRIPTION

Figure 1:
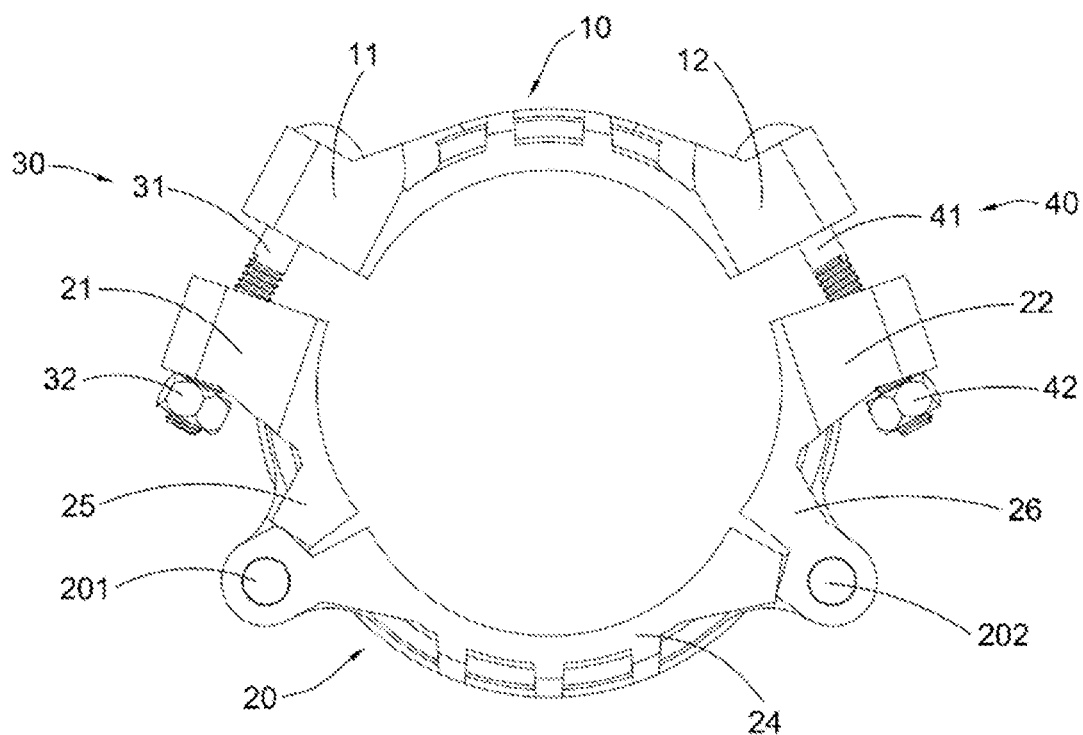
FIG. 1 is a front schematic diagram of a first preferred embodiment in the present application in an unfastened state.

The following description is used to disclose the present application so that those skilled in the art can realize the present application. The preferred embodiments in the following description are only for example, and those skilled in the art can think of other obvious modifications. The basic principles of the present application defined in the following description can be applied to other embodiments, modification solutions, improvement solutions, equivalent solutions and other technical solutions within the spirit and scope of the present application.

Those skilled in the art should understand that in the disclosure of the present, the terms for indicating the orientation or the position relationship like "longitudinal", "transverse", "upper", "lower", "front", "rear", "left", "right", "vertical", "horizontal", "top", "bottom", "inner", "outer" and so on are based on the orientation or the position relationship in the figures, which are only for the convenience of describing the present application and simplifying the description, rather than indicating or implying that the device or element must have a specific orientation, or be constructed and operated in a specific orientation. Therefore, the above terms cannot be understood as a limitation of the present application.

It should be understood that, the term "a" should be understood as "at least one" of "one or more", that is in an embodiment, the quantity of the element can be one, while in another embodiment, the quantity of this element can be multiple. The term "a" cannot be understood as a limitation of the quantity.

The quick coupler according to the present application includes three main parts: an arc top ring 10, an arc bottom ring 20 and two fasteners 30 (40). The top ring 10 may be engaged with the bottom ring 20 to be assembled together. The top ring 10 is further provided with a top ring groove 13, and the bottom ring 20 is further provided with a bottom ring groove 23. The fasteners 30 (40) may be loosely or tightly connected to the top ring 10 and the bottom ring 20, so that the top ring 10 and the bottom ring 20 can be fixedly connected as a whole to form an annular groove 50 for fixing pipes. In particular, at least one of the top ring 10 and the bottom ring 20 consists of a plurality of movably connected components, so that the quick coupler according to the present application has a certain flexibility in fixing and assembling, which can realize a loose or tight fixation.

Figure 2:
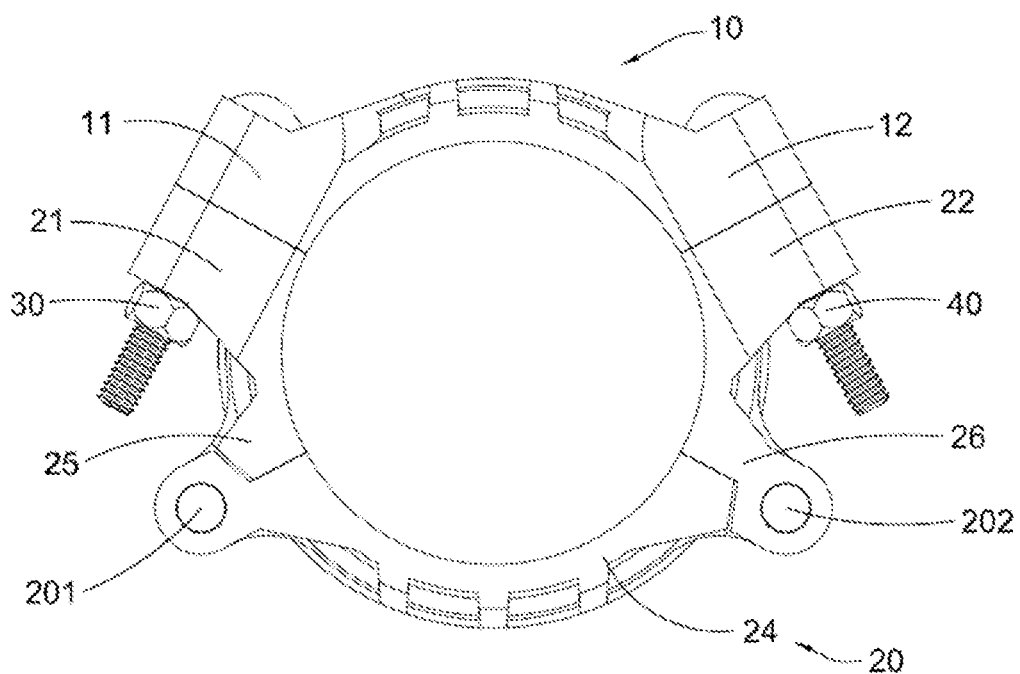
FIG. 2 is a front schematic diagram of a first preferred embodiment in the present application in a fastened state.
Figure 3:
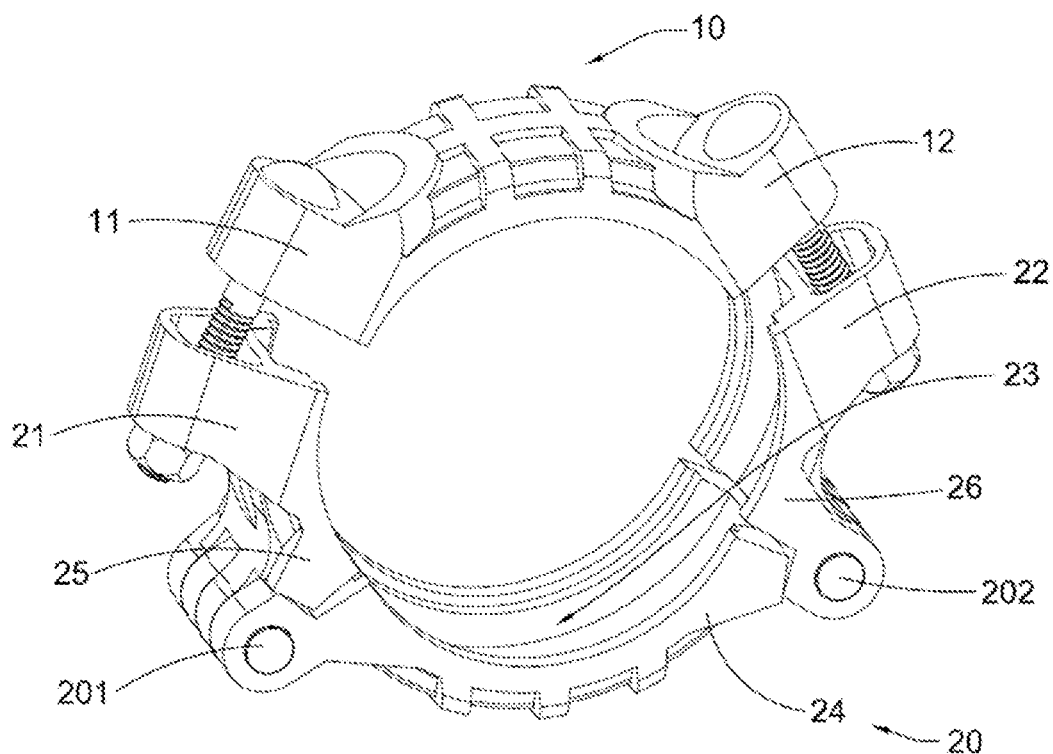
FIG. 3 is a front perspective schematic diagram of a first preferred embodiment in the present application.
Figure 4:
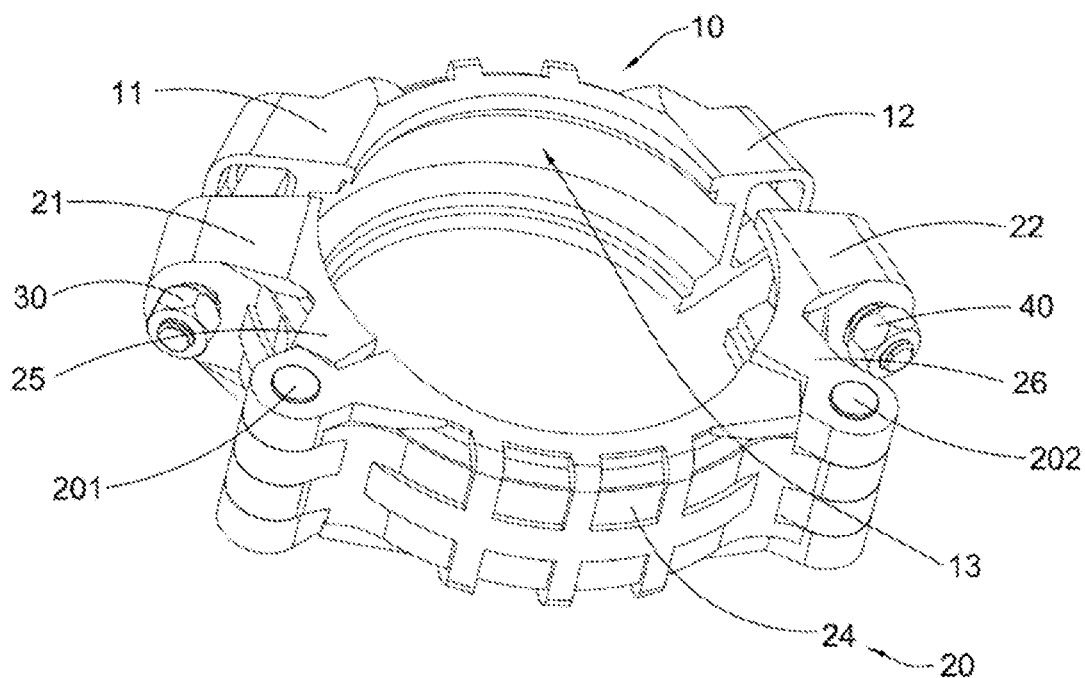
FIG. 4 is a bottom perspective schematic diagram of a first preferred embodiment in the present application.
Figure 5:
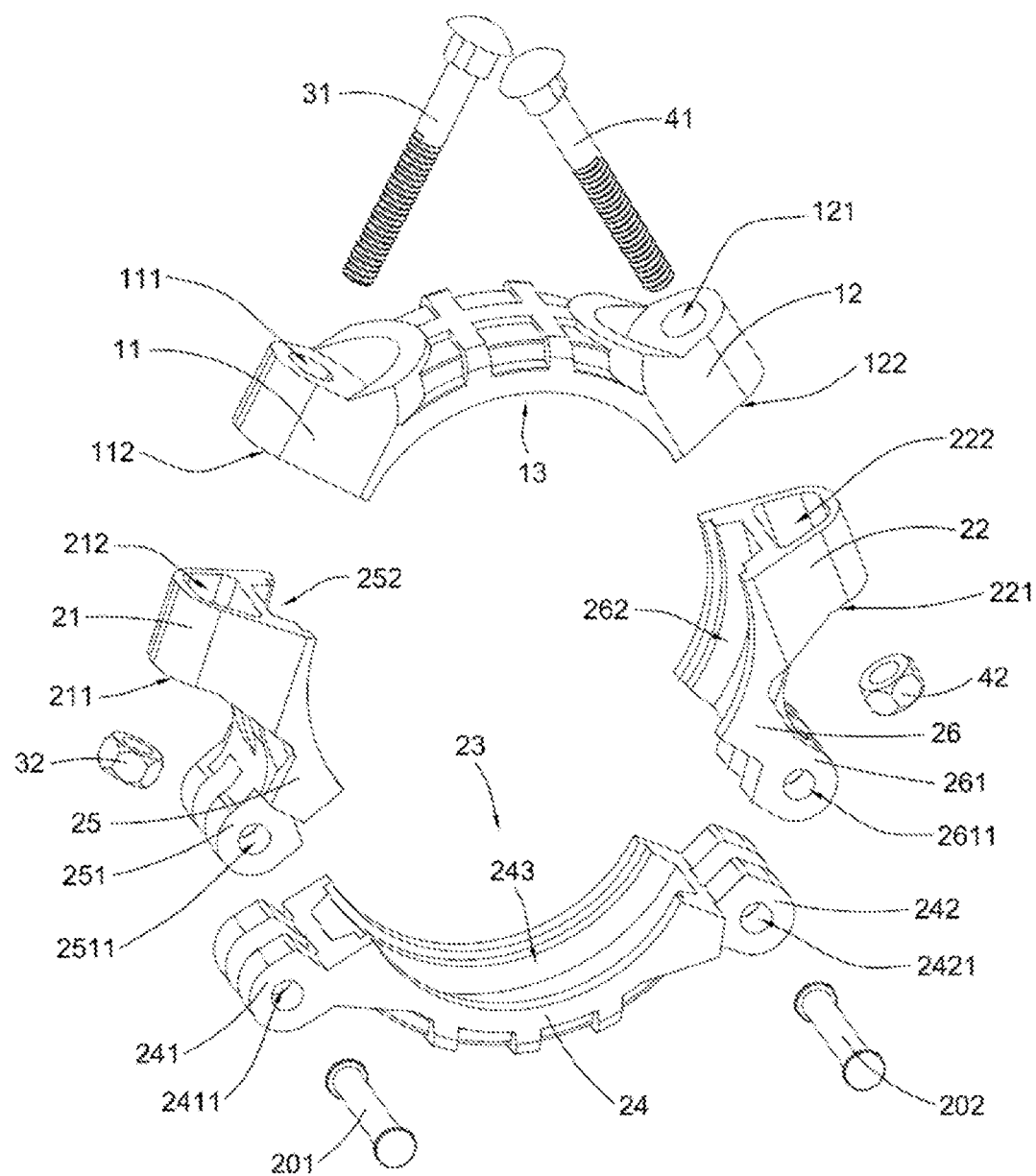
FIG. 5 is an explosion schematic diagram of a first preferred embodiment in the present application.
Figure 6:
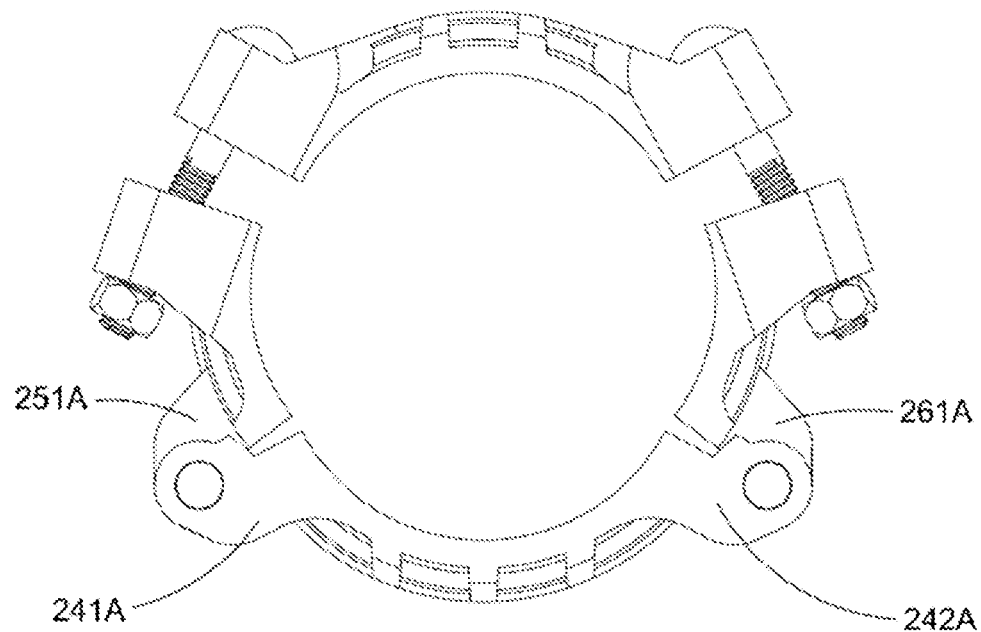
FIG. 6 is a front schematic diagram of a second preferred embodiment in the present application in an unfastened state.
Figure 7:
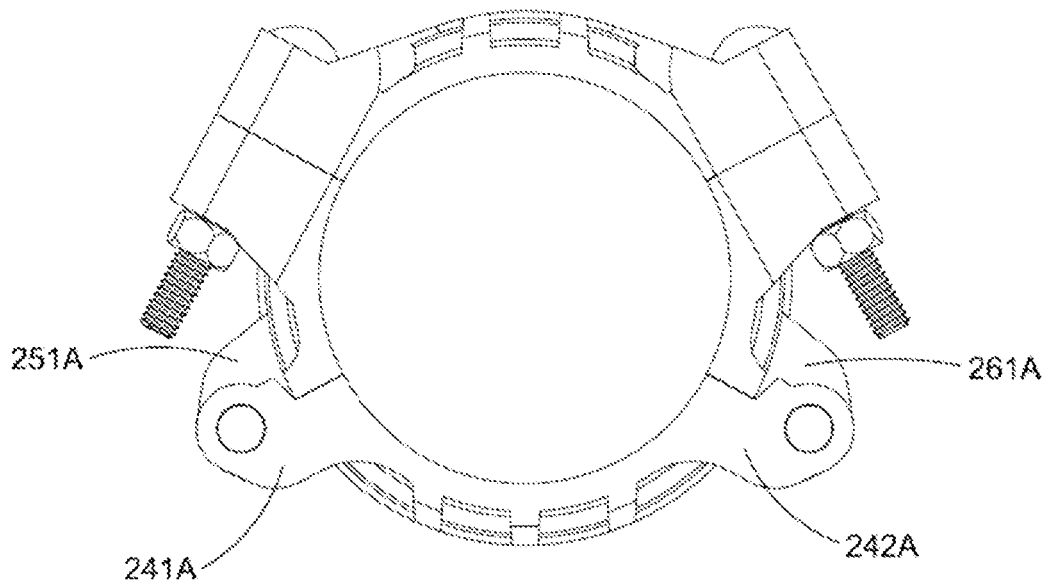
FIG. 7 is a front schematic diagram of a second preferred embodiment in the present application in a fastened state.
Figure 8:
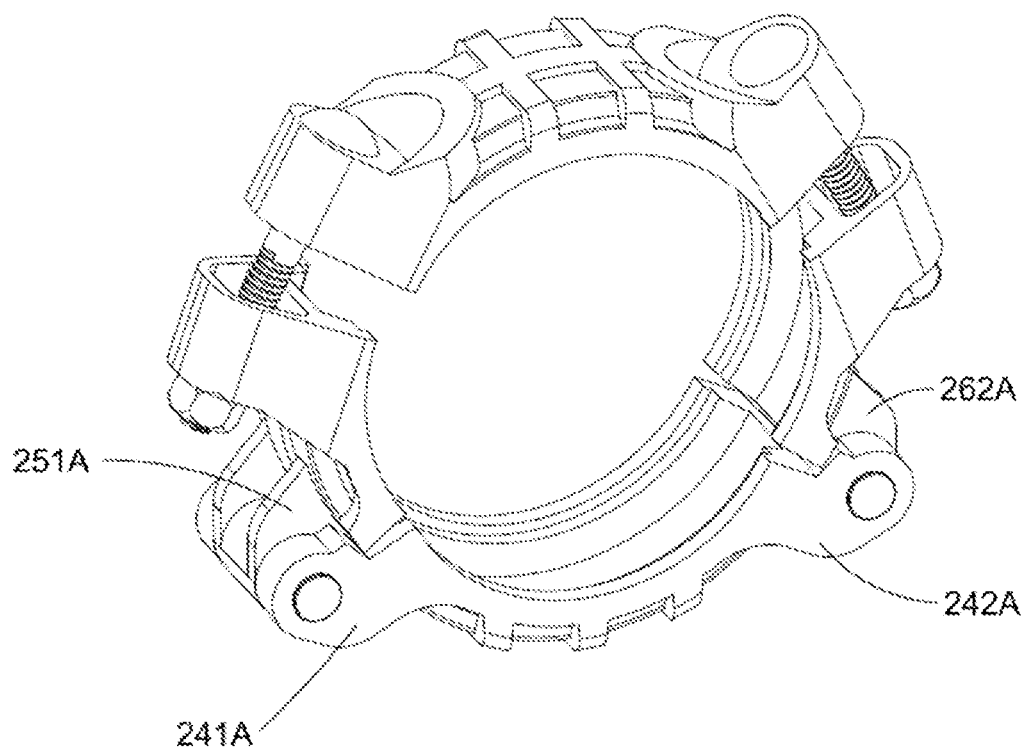
FIG. 8 is a front perspective schematic diagram of a second preferred embodiment in the present application.
Figure 9:
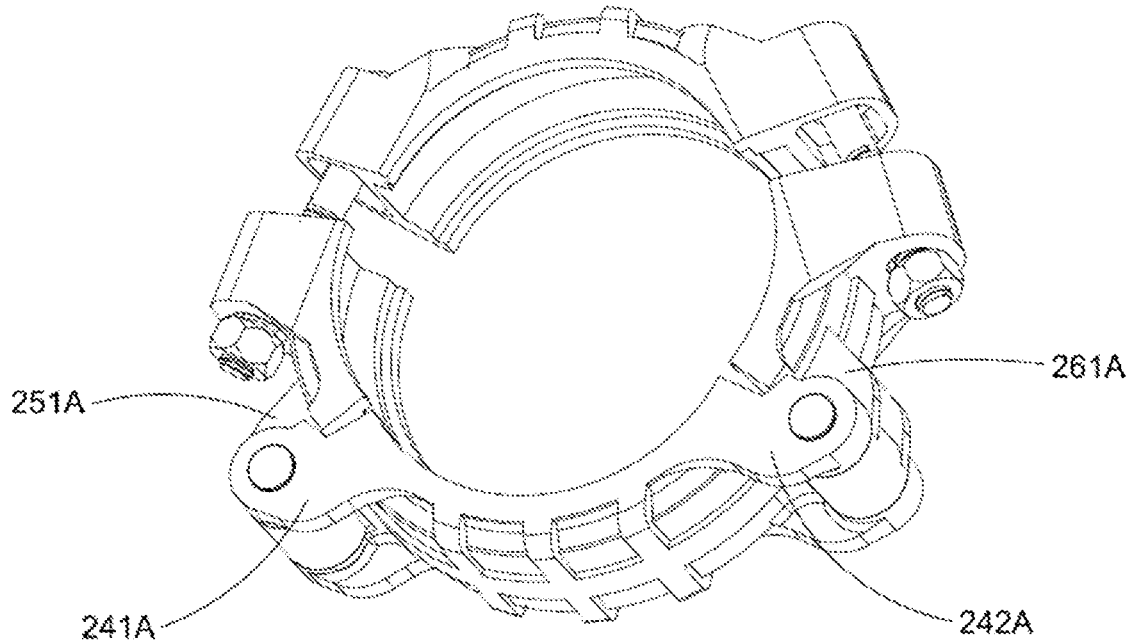
FIG. 9 is a bottom perspective schematic diagram of a second preferred embodiment in the present application.
Figure 10:
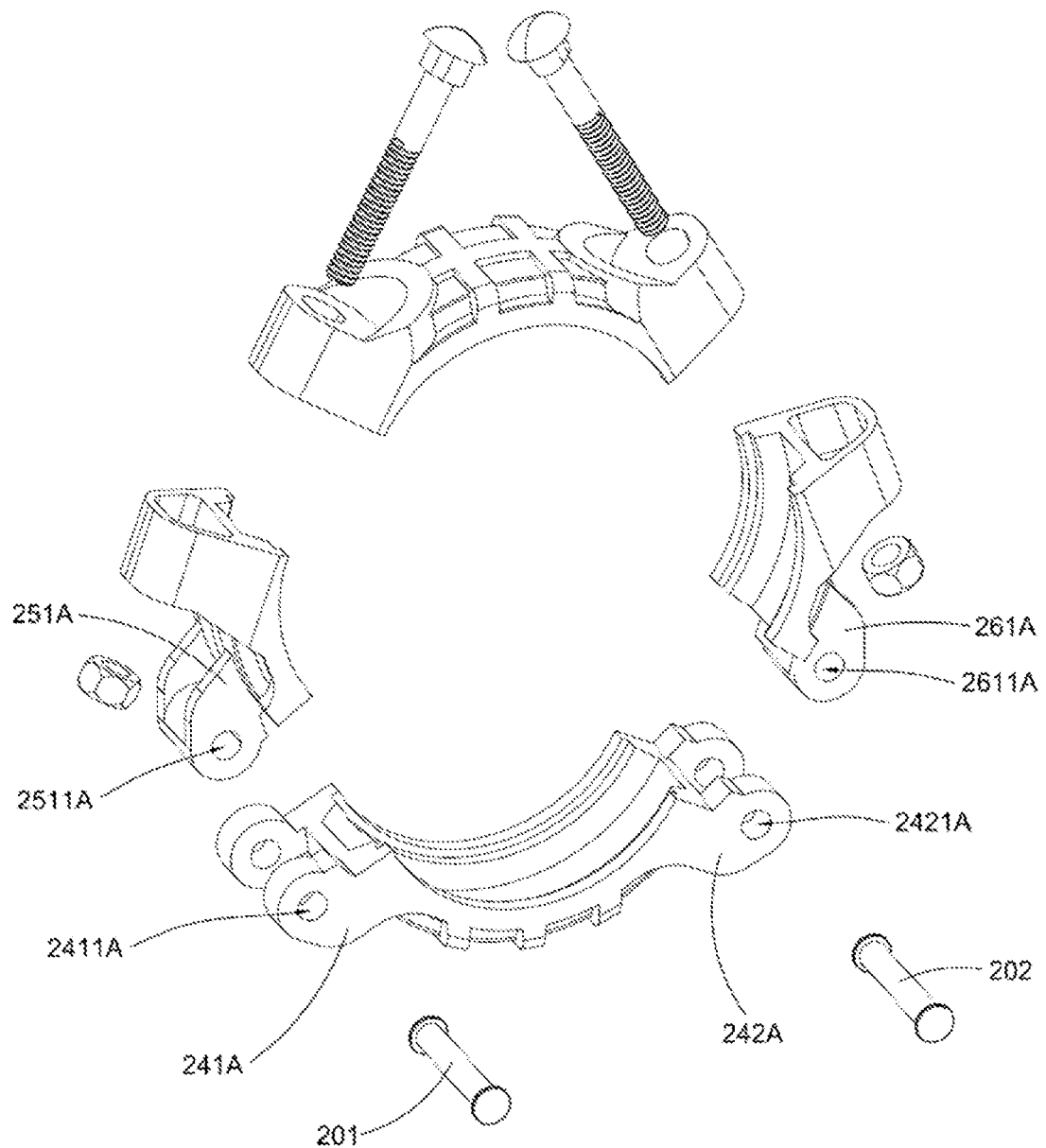
FIG. 10 is an explosion schematic diagram of a second preferred embodiment in the present application.

FIGS. 1-5 illustrate a first preferred embodiment of the present application. In the first preferred embodiment, a quick coupler includes an arc top ring 10, an arc bottom ring 20, a left fastener 30 and a right fastener 40. The top ring 10 may be assembled with the bottom ring 20 as a whole by the left fastener 30 and the right fastener 40 at two sides respectively, as shown in FIG. 2.

The top ring 10 further includes a top ring left fixing head 11 and a top ring right fixing head 12. In addition, the top ring 10 is provided with a top ring groove 13 on the arc inner side of the top ring 10. The top ring left fixing head 11 and the top ring right fixing head 12 are positioned on two ends of the top ring 10 respectively. In addition, the top ring left fixing head 11 is provided with a top ring left fixing hole 111 positioned in the middle of the upper end thereof and a top ring left activity groove 112 positioned in the middle of the lower end thereof, and the top ring right fixing head 12 is provided with a top ring right fixing hole 121 positioned in the middle of the upper end thereof and a top ring right activity groove 122 positioned in the middle of the lower end thereof.

The bottom ring 20 further includes a bottom ring left fixing head 21, a bottom ring right fixing head 22, an arc bottom ring middle part 24, an arc bottom ring left part 25, an arc bottom ring right part 26, a bottom ring left shaft member 201 and a bottom ring right shaft member 202. In addition, the bottom ring 20 is provided with a bottom ring groove 23 positioned on the arc inner side of the bottom ring 20. The bottom ring left part 25 can be movably connected to the bottom ring right part 26.

The bottom ring left fixing head 21 protrudes from the upper end of the bottom ring left part 25. The bottom ring right fixing head 22 protrudes from the upper end of the bottom ring right part 26. The bottom ring left fixing head 21 is provided with a bottom ring left fixing through hole 211 positioned in the middle of the lower end thereof, and a bottom ring left activity groove 212 positioned in the middle of the upper end thereof. The bottom ring right fixing head 22 is provided with a bottom ring right fixing through hole 221 positioned in the middle of the lower end thereof, and a bottom ring right activity groove 222 positioned in the middle of the upper end thereof.

The left fastener 30 can be loosely or tightly connected to the top ring left fixing head 11 and the bottom ring left fixing head 21. The right fastener 40 can also be loosely or tightly connected to the top ring right fixing head 12 and the bottom ring right fixing head 22.

The left fastener 30 further includes a left bolt 31 and a left nut 32. The right fastener 40 further includes a right bolt 41 and a right nut 42. The left bolt 31 penetrates through the top ring left fixing hole 111 of the top ring left fixing head 11 and the bottom ring left fixing hole 211 of the bottom ring left fixing head 21. The left nut 32 can be mounted on the lower end of the left bolt 31 loosely or tightly. The right bolt 41 penetrates through the top ring right fixing hole 121 of the top ring right fixing head 12 and the bottom ring right fixing hole 221 of the bottom ring right fixing head 22. The right nut 42 can be mounted on the lower end of the right bolt 41 loosely or tightly.

The bottom ring middle part 24 further includes a bottom ring left activity base 241 and a bottom ring right activity base 242, which are positioned on two ends of the bottom ring middle part 24 respectively. In addition, the bottom ring middle part 24 is provided with a bottom ring middle groove 243 positioned on the arc inner side of the bottom ring middle part 24.

The bottom ring left part 25 further includes a bottom ring left activity head 251 protruding downwards from the lower end. In addition, the bottom ring left part 25 is provided with a bottom ring left groove 252 positioned on the arc inner side of the bottom ring left part 25. The bottom ring right part 26 further includes a bottom ring right activity head 261 protruding downwards from the lower end, and the bottom ring right part 26 is provided with a bottom ring right groove 262 positioned on the arc inner side of the bottom ring right part 26.

The bottom ring left shaft member 201 may movably connects the bottom ring left activity head 251 of the bottom ring left part 25 with the bottom ring left activity base 241 of the bottom ring middle part 24. The bottom ring right shaft member 202 may movably connects the bottom ring right activity head 261 of the bottom ring right part 26 with the bottom ring right activity base 242 of the bottom ring middle part 24.

Further, both of the bottom ring left activity base 241 and the bottom ring right activity base 242 have a two-pieces structure. The bottom ring left activity base 241 is provided with a bottom ring left activity base connecting hole 2411. The bottom ring right activity base 242 is provided with a bottom ring right activity base connecting hole 2421. The bottom ring left activity head 251 and the bottom ring right activity head 261 both have a two-pieces structure. The bottom ring left activity head 251 is provided with a bottom ring left activity head connecting hole 2511. The bottom ring right activity head 261 is provided with a bottom ring right activity head connecting hole 2611.

The bottom ring left activity head 251 and the bottom ring left activity base 241 fit together. The bottom ring left shaft member 201 penetrates the bottom ring left rotatable hear connecting hole 2511 of the bottom ring left activity head 251 and the bottom ring left activity base connecting hole 2411 of the bottom ring left activity base 241, so as to form a moveable connection between the bottom ring left activity head 251 and the bottom ring left activity base 241.

The bottom ring right activity head 261 and the bottom ring right activity base 242 fit together. The bottom ring right shaft member 202 penetrates the bottom ring right activity head connecting hole 2611 of the bottom ring right activity head 261 and the bottom ring right activity base connecting hole 2421 of the bottom ring right activity base 242, so as to form a moveable connection between the bottom ring right activity head 261 and the bottom ring right activity base 242.

FIG. 1 shows a first preferred embodiment of the present application in an unfastened state. In the unfastened state, the top ring 10 and the bottom ring 20 are loosely connected together as a whole by the left fastener 30 and the right fastener 40. At this time, the top ring 10 does not abut against the bottom ring 20. The bottom ring middle part 24, the bottom left part 25 and the bottom ring right part 26 of the bottom ring 20 are in an unfastened connection state.

At this time, the left bolt 31 can limitedly move between the top ring left activity groove 112 and the bottom ring left activity groove 212. The right bolt 41 can limitedly move between the top ring right activity groove 122 and the bottom ring right activity groove 222. The left nut 32 is mounted on the lowest end of the left bolt 31, and the right nut 42 is mounted on the lowest end of the right bolt 41.

FIG. 2 shows the first preferred embodiment of the present application in a tight state. In the tight state, the left fastener 30 and the right fastener 40 are fastened. The bottom ring middle part 24, the bottom ring left part 25 and the bottom ring right part 26 are tightly jointed due to the stress. The bottom ring middle groove 243 of the bottom ring middle part 24, the bottom ring left groove 252 of the bottom ring left part 25 and the bottom ring right groove 262 of the bottom ring right part 26 are assembled to form the bottom ring groove 23. The top ring 10 and the bottom ring 20 are tightly joined due to the stress. The top ring groove 13 of the top ring 10 and the bottom ring groove 23 of the bottom ring 20 are assembled to form an annular groove 50 for fixing the pipes.

In the unfastened state, an end of a pipe or tube to be connected is placed in the annular groove 50. The end of a pipe or tube to be fixed can be fixed in the annular groove 50 tightly by fastening the left fastener 30 and the right fastener 40, so as to realize the fast fixing of the pipes or the fittings.

FIGS. 6-10 illustrate a second preferred embodiment of the present application. The second preferred embodiment is the modification of the first preferred embodiment. The second preferred embodiment of the present application differs in that, the bottom ring left activity base 241 is modified to another bottom ring left activity base 241A, the bottom ring right activity base 242 is modified to another bottom ring right activity base 242A, the bottom ring left activity head 251 is modified to another bottom ring left activity head 251A, and the bottom ring right activity head 261 is modified to another bottom ring right activity head 261A.

The bottom ring left activity base 241A is provided with a bottom ring left activity base connecting hole 2411A, and the bottom ring right activity base 242A is provided with a bottom ring right activity base connecting hole 2421A. The bottom ring left activity head 251A is provided with a bottom ring left activity head connecting through hole 2511A, and the bottom ring right activity head 261A is provided with a bottom ring right activity head connecting through hole 2611A.

The bottom ring left activity base 241A and the bottom ring right activity base 242A both have a two-pieces structure. The bottom ring left activity head 251A is clamped between the two-pieces structure of the bottom ring left activity base 241A, and the bottom ring right activity head 261A is clamped between the two-pieces structure of the bottom ring right activity base 242A. In addition, the bottom ring left shaft member 201 may movably connects the bottom ring left activity base 241A with the bottom ring left activity head 251A. The bottom ring right shaft member 202 movably connects the bottom ring right activity base 242A with the bottom ring right activity head 261A.

With the modifications of the above components, the second preferred embodiment may realize the same or the similar effect with the first preferred embodiment.

Figure 11:
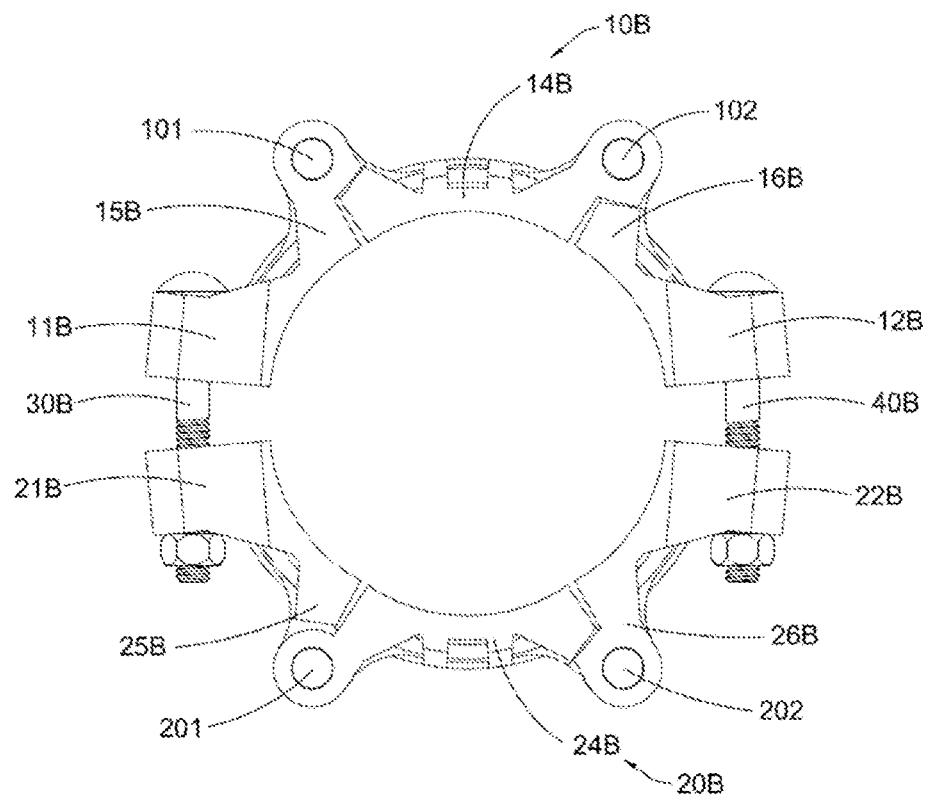
FIG. 11 is a front schematic diagram of a third preferred embodiment in the present application in an unfastened state.
Figure 12:
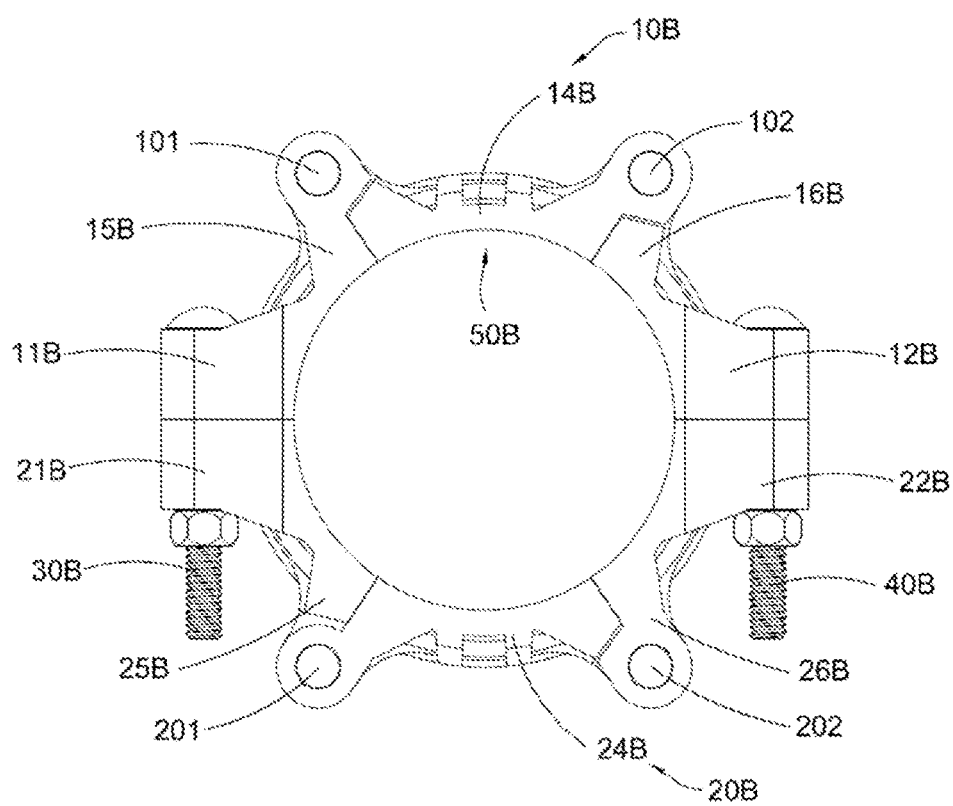
FIG. 12 is a front schematic diagram of a third preferred embodiment in the present application in a fastened state.
Figure 13:
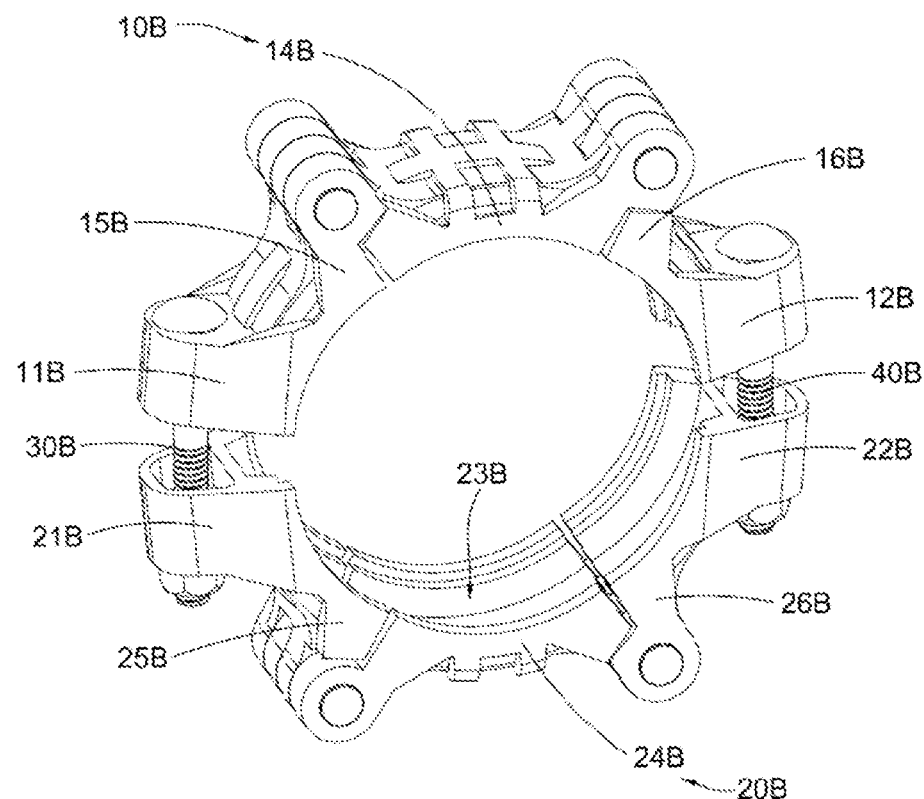
FIG. 13 is a front perspective schematic diagram of a third preferred embodiment in the present application.
Figure 14:
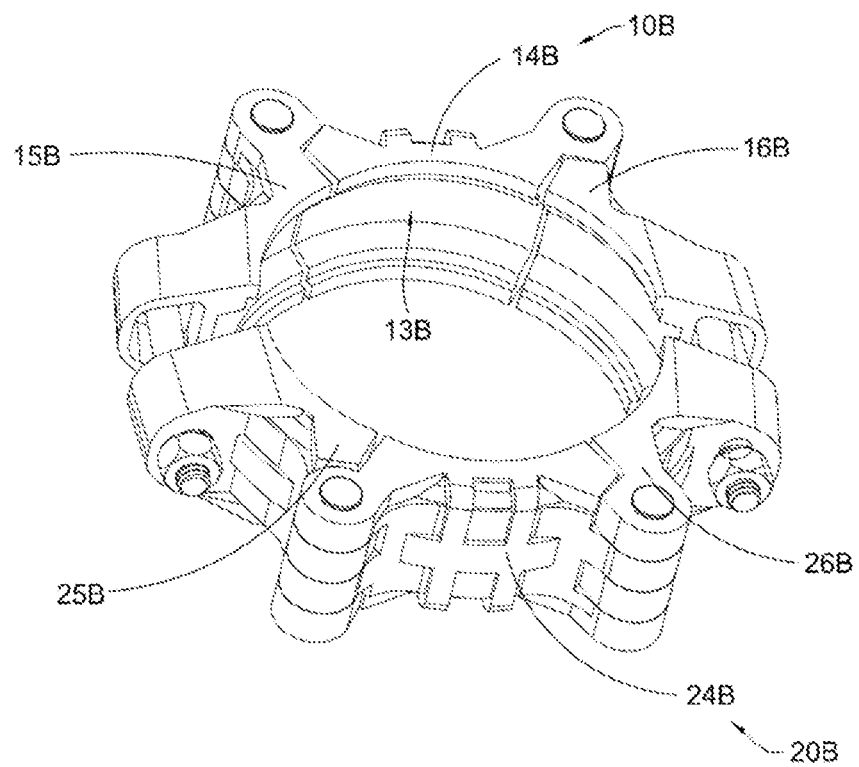
FIG. 14 is a bottom perspective schematic diagram of a third preferred embodiment in the present application.
Figure 15:
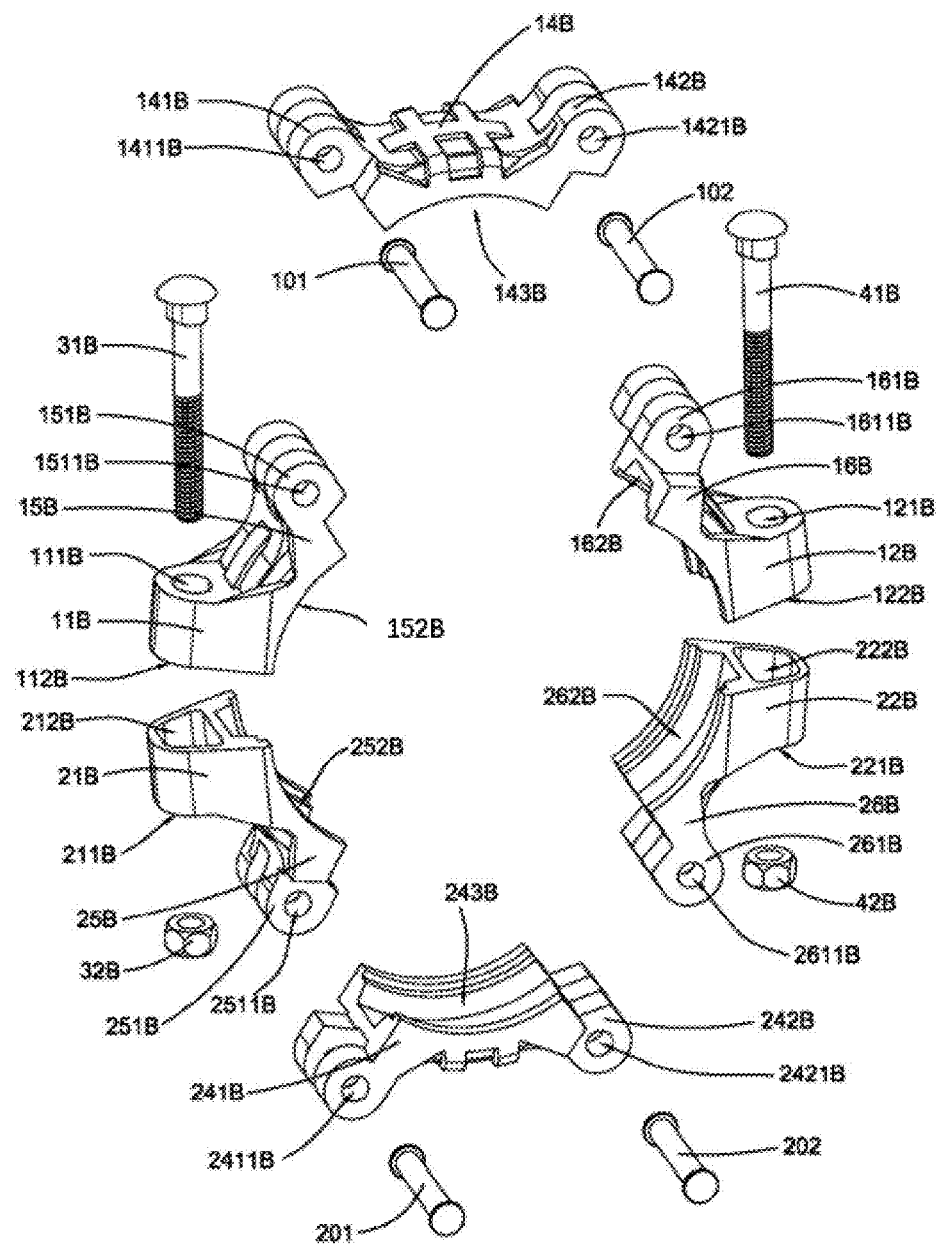
FIG. 15 is an explosion schematic diagram of a third preferred embodiment in the present application.
Figure 16:
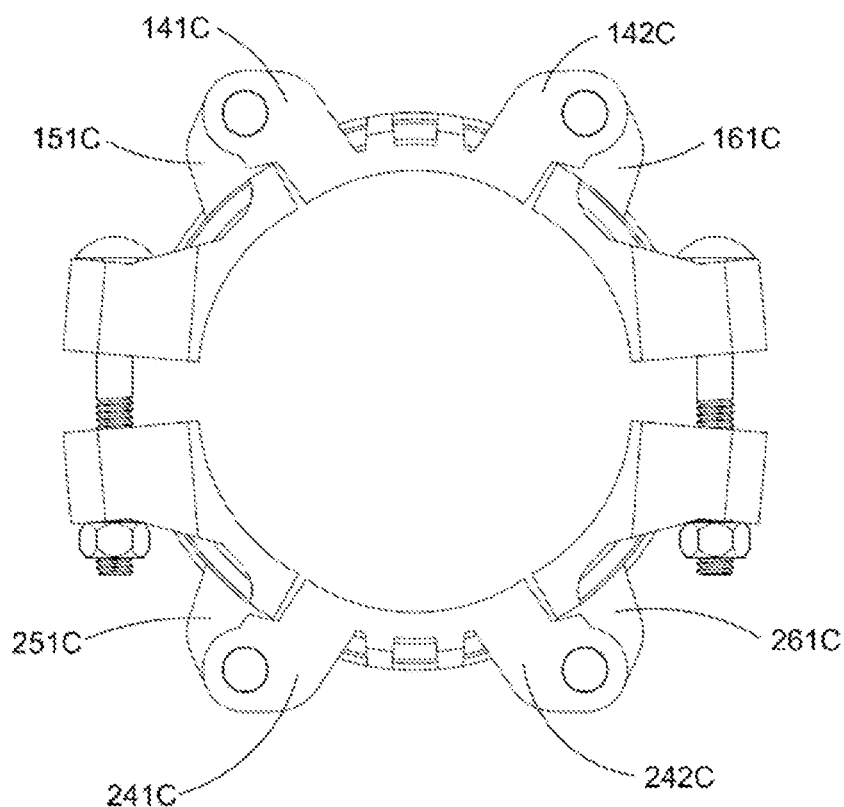
FIG. 16 is a front schematic diagram of a fourth preferred embodiment in the present application in an unfastened state.
Figure 17:
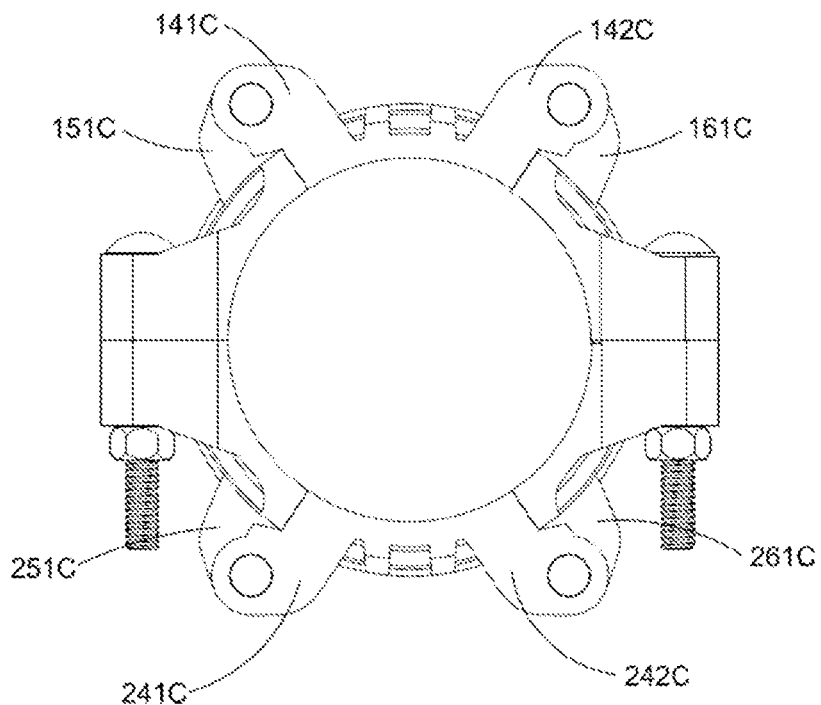
FIG. 17 is a front schematic diagram of a fourth preferred embodiment in the present application in a fastened state.
Figure 18:
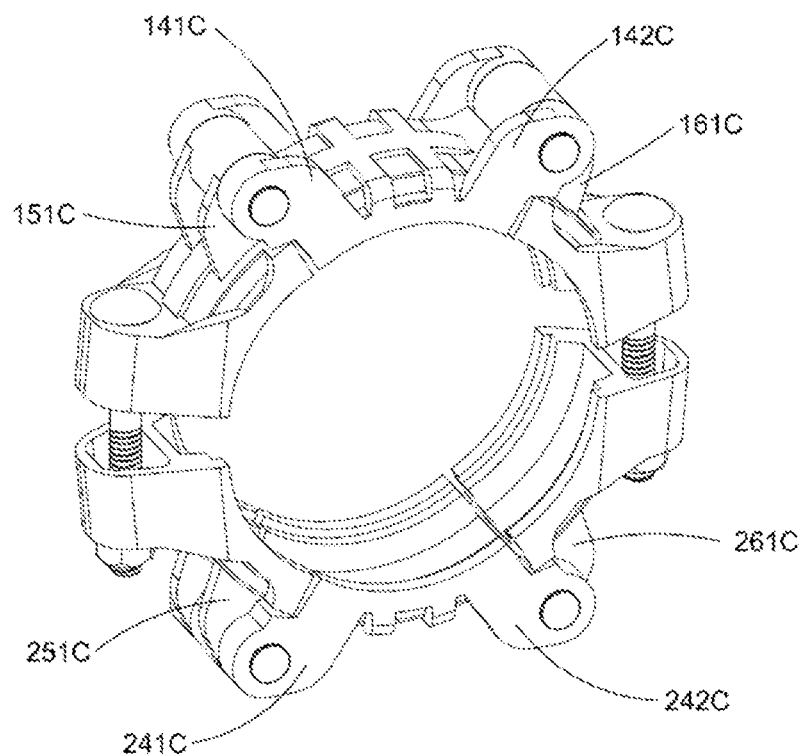
FIG. 18 is a front perspective schematic diagram of a fourth preferred embodiment in the present application.
Figure 19:
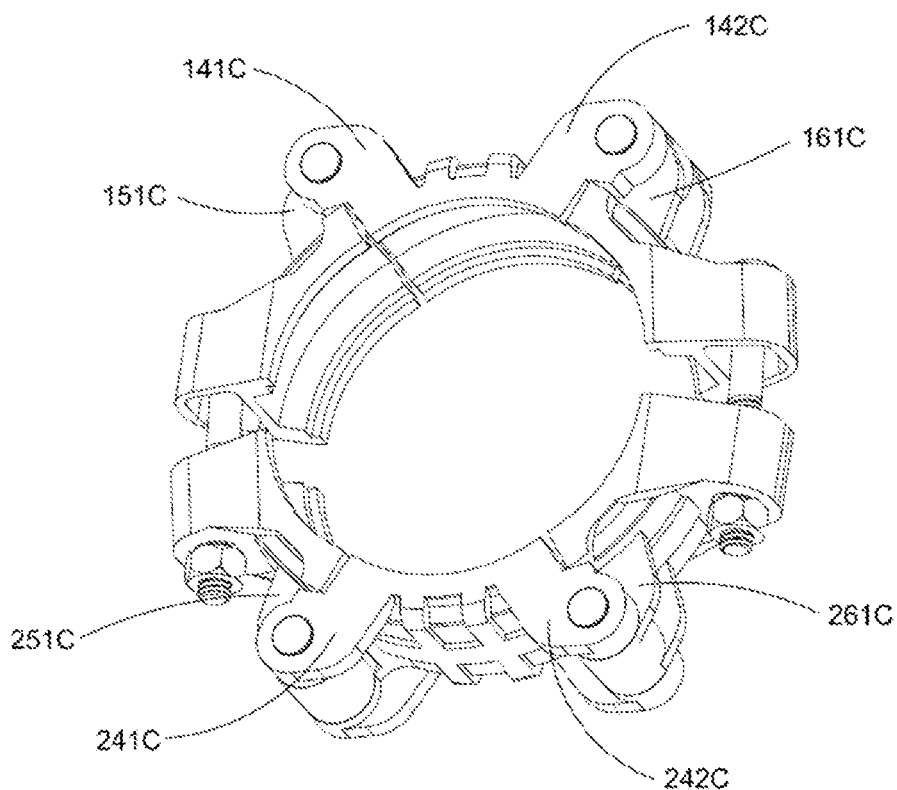
FIG. 19 is a bottom perspective schematic diagram of a fourth preferred embodiment in the present application.
Figure 20:
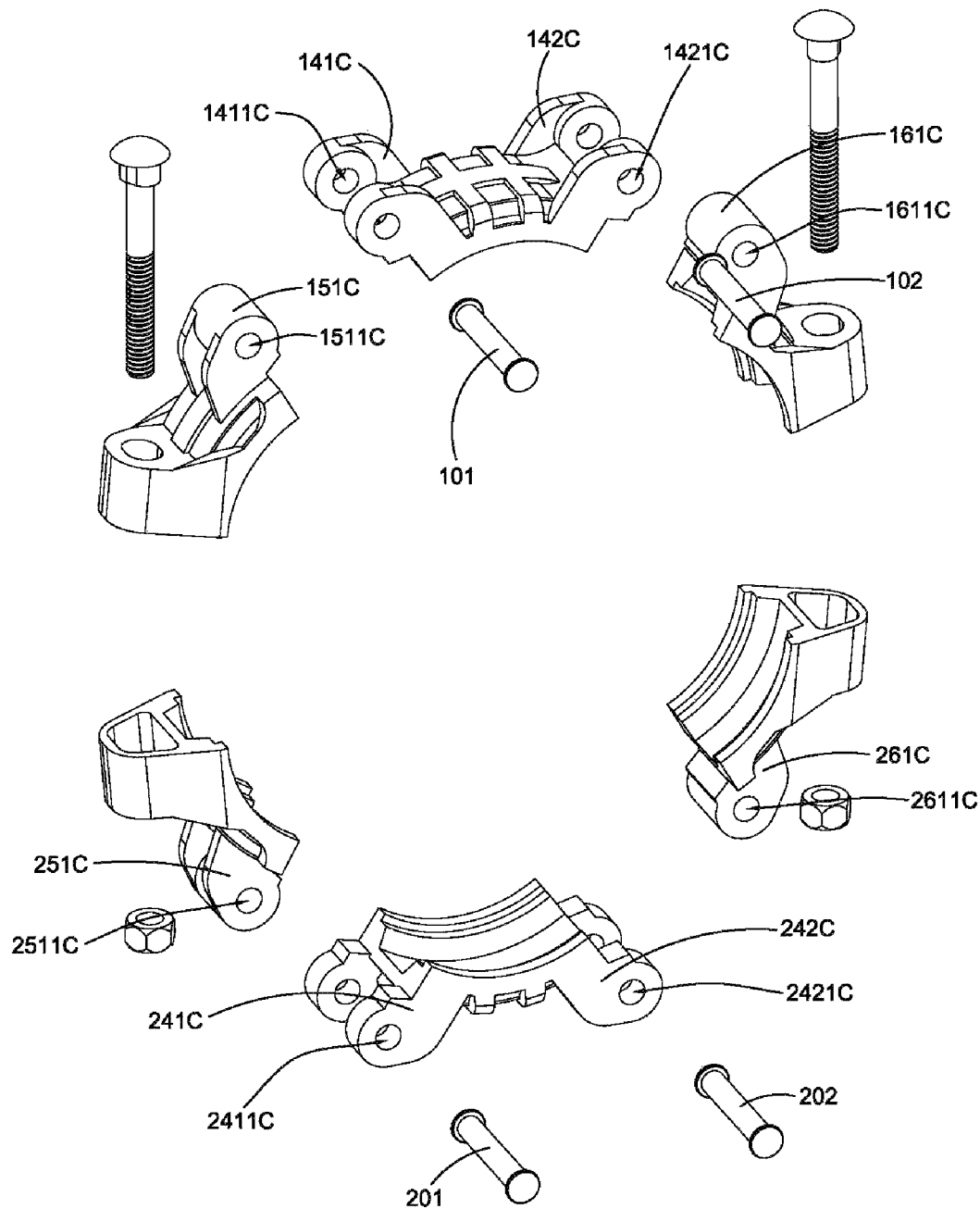
FIG. 20 is an explosion schematic diagram of a fourth preferred embodiment in the present application.

FIGS. 11-15 illustrate a third preferred embodiment of the present application. The third preferred embodiment includes an arc top ring 10B, an arc bottom ring 20B, a left fastener 30B and a right fastener 40B. The top ring 10B and the bottom ring 20B can be combined together as a whole by fixing the left fastener 30B and the right fastener 40B on two sides respectively, as shown in FIG. 12.

The top ring 10B further includes a top ring left fixing head 11B, a top ring right fixing head 12B, a top ring middle part 14B, a top ring left part 15B, a top ring right part 16B, a top ring left shaft member 101 and a top ring right shaft member 102. In addition, the top ring 10B is provided with a top ring groove 13B on the arc inner side of the top ring 10B. The top ring left part 15B and the top ring right part 16B can be movably connected to the two ends of the top ring middle part 14B respectively.

The top ring left fixing head 11B protrudes from the lower end of the top ring left part 15B. The top ring right fixing head 12B protrudes from the lower end of the top ring right part 16B. The top ring left fixing head 11B is provided with a top ring left fixing through hole 111B positioned in the middle of the upper end thereof, and a top ring left activity groove 112B positioned in the middle of the lower end thereof. The top ring right fixing head 12B is provided with a top ring right fixing through hole 121B positioned in the middle of the upper end thereof, and a top ring right activity groove 122B positioned in the middle of the lower end thereof.

The bottom ring 20B further includes a bottom ring left fixing head 21B, a bottom ring right fixing head 22B, a bottom ring middle part 24B, a bottom ring left part 25B, a bottom ring right part 26B, a bottom ring left shaft member 201 and a bottom ring right shaft member 202. In addition, the bottom ring 20B is provided with a bottom ring groove 23B positioned on the arc inner side of the bottom ring 20B. The bottom ring left part 25B and the bottom ring right part 26B can be movably connected to the two ends of the bottom ring middle part 24B respectively.

The bottom ring left fixing head 21B protrudes from the upper end of the bottom ring left part 25B. The bottom ring right fixing head 22B protrudes from the upper end of the bottom ring right part 26B. The bottom ring left fixing head 21B is provided with a bottom ring left fixing through hole 211B positioned in the middle of the lower end thereof, and a bottom ring left activity groove 212B positioned in the middle of the upper end thereof. The bottom ring right fixing head 22B is provided with a bottom ring right fixing through hole 221B positioned in the middle of the lower end thereof, and a bottom ring right activity groove 222B positioned in the middle of the upper end thereof.

The left fastener 30B can be loosely or tightly connected to the top ring left fixing head 11B and the bottom ring left fixing head 21B. The right fastener 40B can also be loosely or tightly connected to the top ring right fixing head 12B and the bottom ring right fixing head 22B.

The left fastener 30B further includes a left bolt 31B and a left nut 32B. The right fastener 40B further includes a right bolt 41B and a right nut 42B. The left bolt 31B penetrates through the top ring left fixing hole 111B of the top ring left fixing head 11B and the bottom ring left fixing hole 211B of the bottom ring left fixing head 21B. The left nut 32B can be mounted on the lower end of the left bolt 31B loosely or tightly. The right bolt 41B penetrates through the top ring right fixing hole 121B of the top ring right fixing head 12B and the bottom ring right fixing hole 221B of the bottom ring right fixing head 22B. The right nut 42B can be mounted on the lower end of the right bolt 41B loosely or tightly.

The top ring middle part 14B further includes a top ring left activity base 141B and a top ring activity base 142B, which are positioned on two ends of the top ring middle part 14B respectively. In addition, the top ring middle part 14B is provided with a top ring middle groove 143B positioned on the arc inner side of the top ring middle part 14B.

The top ring left part 15B further includes a top ring left activity head 151B protruding upwards from the upper end. In addition, the top ring left part 15B is provided with a top ring left groove 152B positioned on the arc inner side of the top ring left part 15B. The top ring right part 16B further includes a top ring right activity head 161B protruding upwards from the upper end, and the top ring right part 16B is provided with a top ring right groove 162B positioned on the arc inner side of the top ring right part 16B.

The top ring left shaft member 101 movably connects the top ring left activity head 151B of the top ring left part 15B with the top ring left activity base 141B of the top ring middle part 14B. The top ring right shaft member 102 may movably connects the top ring right activity head 161B of the top ring right part 16B with the top ring right activity base 142B of the top ring middle part 14B.

Further, the top ring left activity base 141B and the top right activity base 142B both have a two-pieces structure. The top ring left activity base 141B is provided with a top ring left activity base connecting hole 1411B. The top ring right activity base 142B is provided with a top ring right activity base connecting hole 1421B. The top ring left activity head 151B and the top ring right activity head 161B both have a two-pieces structure. The top ring left activity head 151B is provided with a top ring left activity head connecting hole 1511B. The top ring right activity head 161B is provided with a top ring right activity head connecting hole 1611B.

The top ring left activity head 151B and the top ring left activity base 141B fit together. The top ring left shaft member 101 penetrates the top ring left activity head connecting hole 1511B of the top ring left activity head 151B and the top ring left activity base connecting hole 1411B of the top ring left activity base 141B, so as to form a moveable connection between the top ring left activity head 151B and the top ring left activity base 141B.

The top ring right activity head 161B and the top ring right activity base 142B fit together. The top ring right shaft member 102 penetrates the top ring right activity head connecting hole 1611B of the top ring right activity head 161B and the top ring right activity base connecting hole 1421B of the top ring right activity base 142B, so as to form a moveable connection between the top ring right activity head 161B and the top ring right activity base 142B.

The bottom ring middle part 24B further includes a bottom ring left activity base 241B and a bottom ring right activity base 242B, which are positioned on two ends of the bottom ring middle part 24B respectively. The bottom ring middle part 24B is provided with a bottom ring middle groove 243B on the arc inner side of the bottom ring middle part 24B.

The bottom ring left part 25B further includes a bottom ring left activity head 251B protruding downwards from the lower end. In addition, the bottom ring left part 25B is provided with a bottom ring left groove 252B positioned on the arc inner side of the bottom ring left part 25B. The bottom ring right part 26B further includes a bottom ring right activity head 261B protruding downwards from the lower end, and the bottom ring right part 26B is provided with a bottom ring right groove 262B positioned on the arc inner side of the bottom ring right part 26B.

The bottom ring left shaft member 201 may movably connects the bottom ring left activity head 251B of the bottom ring left part 25B with the bottom ring left activity base 241B of the bottom ring middle part 24B. The bottom ring right shaft member 202 may movably connects the bottom ring right activity head 261B of the bottom ring right part 26B with the bottom ring right activity base 242B of the bottom ring middle part 24B.

Further, the bottom ring left activity base 241B and the bottom ring right activity base 242B both have a two-pieces structure. The bottom ring left activity base 241B is provided with a bottom ring left activity base connecting hole 2411B. The bottom ring right activity base 242B is provided with a bottom ring right activity base connecting hole 2421B. The bottom ring left activity head 251B and the bottom right activity head 261B both have a two-pieces structure. The bottom ring left activity head 251B is provided with a bottom ring left activity head connecting hole 2511B. The bottom ring right activity head 261B is provided with a bottom ring right activity head connecting hole 2611B.

The bottom ring left activity head 251B and the bottom ring left activity base 241B fit together. The bottom ring left shaft member 201 penetrates the bottom ring left rotatable hear connecting hole 2511B of the bottom ring left activity head 251B and the bottom ring left activity base connecting hole 2411B of the bottom ring left activity base 241B, so as to form a moveable connection between the bottom ring left activity head 251B and the bottom ring left activity base 241B.

The bottom ring right activity head 261B and the bottom ring right activity base 242B fit together. The bottom ring right shaft member 202 penetrates the bottom ring right activity head connecting hole 2611B of the bottom ring right activity head 261B and the bottom ring right activity base connecting hole 2421B of the bottom ring right activity base 242B, so as to form a moveable connection between the bottom ring right activity head 261B and the bottom ring right activity base 242B.

FIG. 11 shows the third preferred embodiment of the present application in an unfastened state. In the unfastened state, the top ring 10B and the bottom ring 20B are loosely connected together as a whole by the left fastener 30B and the right fastener 40B. At this time, the top ring middle part 14B, the top ring left part 15B and the top ring right part 16B of the top ring 10B are in an unfastened connection state. The bottom ring middle part 24B, the bottom left part 25B and the bottom ring right part 26B of the bottom ring 20B are in an unfastened connection state.

As shown in FIG. 12, when fastening the left fastener 30B and the right fastener 40B, the top ring middle part 14B, the top ring left part 15B and the top ring right part 16B of the top ring 10B are tightly jointed due to the stress. The bottom ring middle part 24B, the bottom ring left part 25B and the bottom ring right part 26B of the bottom ring 20B are tightly jointed due to the stress. In addition, the top ring left fixing head 11B of the top ring 10B and the bottom ring left fixing head 21B of the bottom ring 20B are tightly jointed due to the stress. The top ring right fixing head 12B of the top ring 10B and the bottom ring right fixing head 22B of the bottom ring 20B are tightly joint due to the stress, so that the top ring 10B and the bottom ring 20B can by tightly jointed together as a whole.

In addition, the top ring middle groove 143B of the top ring middle part 14B, the top ring left groove 152B of the top ring left part 15B and the top ring right groove 162B of the top ring right part 16B are assembled to form the top ring groove 13B of the top ring 10B. The bottom ring middle groove 243B of the bottom ring middle part 24B, the bottom ring left groove 252B of the bottom ring left part 25B and the bottom ring right groove 262B of the bottom ring right part 26B are assembled to form the bottom ring groove 23B of the bottom ring 20B. Further, the top ring groove 13B of the top ring 10B and the bottom ring groove 23B of the bottom ring 20B are assembled to form an annular groove 50B for fixing the end of the pipes to be fixed.

FIGS. 16-20 illustrate a fourth preferred embodiment of the present application. The fourth preferred embodiment is the modification of the third preferred embodiment. In the fourth preferred embodiment of the present application, the components in the above third preferred embodiment are modified.

The top ring left activity base 141B is modified to another top ring left activity base 141C, the top ring right activity base 142B is modified to another top ring right activity base 142C, the top ring left activity head 151B is modified to another top ring left activity head 151C, and the top ring right activity head 161B is modified to another top ring right activity head 161C.

The bottom ring left activity base 241B is modified to another bottom ring left activity base 241C, the bottom ring right activity base 242B is modified to another bottom ring right activity base 242C, the bottom ring left activity head 251B is modified to another bottom ring left activity head 251C, and the bottom ring right activity head 261B is modified to another bottom ring right activity head 261C.

The top ring left activity base 141C is a two-pieces structure and is provided with a top ring left activity base connecting hole 1411C. The top ring right activity base 142C is a two-pieces structure and is provided with a top ring right activity base connecting hole 1421C. The bottom ring left activity base 241C is a two-pieces structure and is provided with a bottom ring left activity base connecting hole 2411C. The bottom ring right activity base 242C is a two-pieces structure and is provided with a bottom ring right activity base connecting hole 2421C.

The top ring left activity head 151C is provided a top ring left activity head connecting through hole 1511C. The top ring right activity head 161C is provided with a top ring right activity head connecting through hole 1611C. The bottom ring left activity head 251C is provided a bottom ring left activity head connecting through hole 2511C. The bottom ring right activity head 261C is provided with a bottom ring right activity head connecting through hole 2611C.

The top ring left activity head 151C is clamped in the top ring left activity base 141C, and form a moveable connection by mounting the top ring left shaft member 101 in the top ring left activity head connecting hole 1511C and the top ring left activity base connecting hole 1411C. The top ring right activity head 161C is clamped in the top ring right activity base 142C, and form a moveable connection by mounting the top ring right shaft member 102 in the top ring right activity head connecting hole 1611C and the top ring right activity base connecting hole 1421C.

The bottom ring left activity head 251C is clamped in the bottom ring left activity base 241C, and form a moveable connection by mounting the bottom ring left shaft member 201 in the bottom ring left activity head connecting hole 2511C and the bottom ring left activity base connecting hole 2411C. The bottom ring right activity head 261C is clamped in the bottom ring right activity base 242C, and form a moveable connection by mounting the bottom ring right shaft member 202 in the bottom ring right activity head connecting hole 2611C and the bottom ring right activity base connecting hole 2421C.

With the modifications of the above components, the fourth preferred embodiment may realize the same or the similar effect with the third preferred embodiment.

Figure 21:
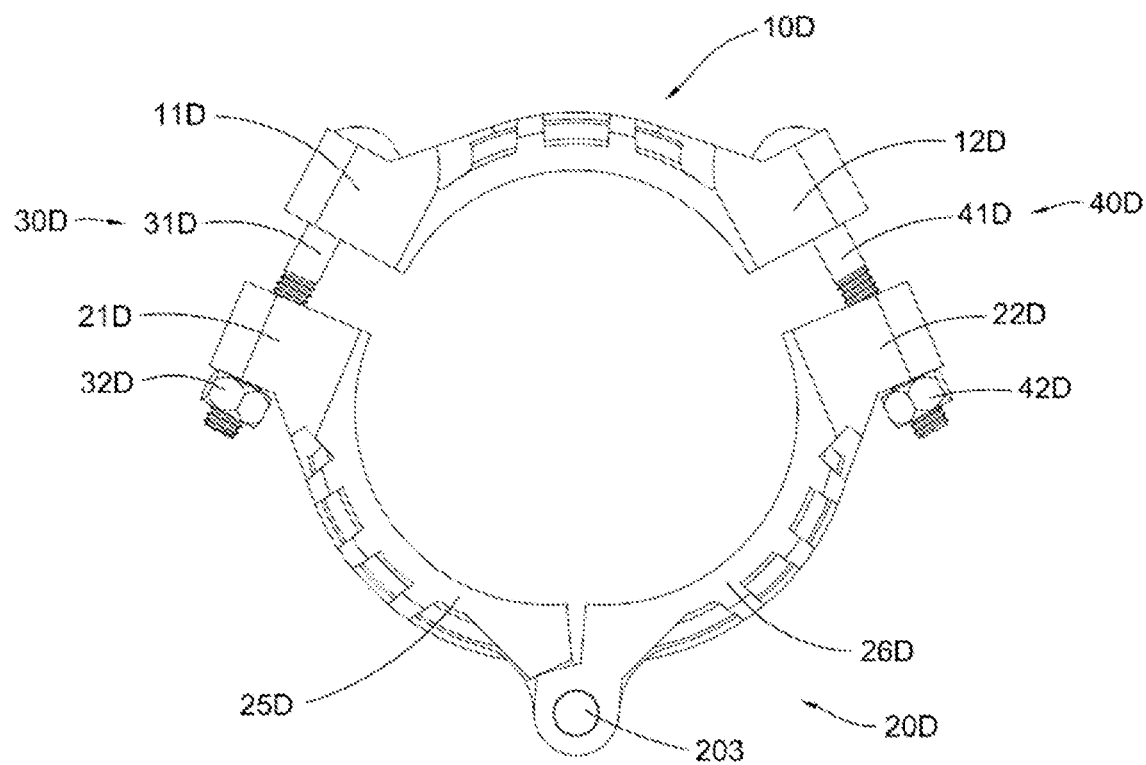
FIG. 21 is a front schematic diagram of a fifth preferred embodiment in the present application in an unfastened state.
Figure 22:
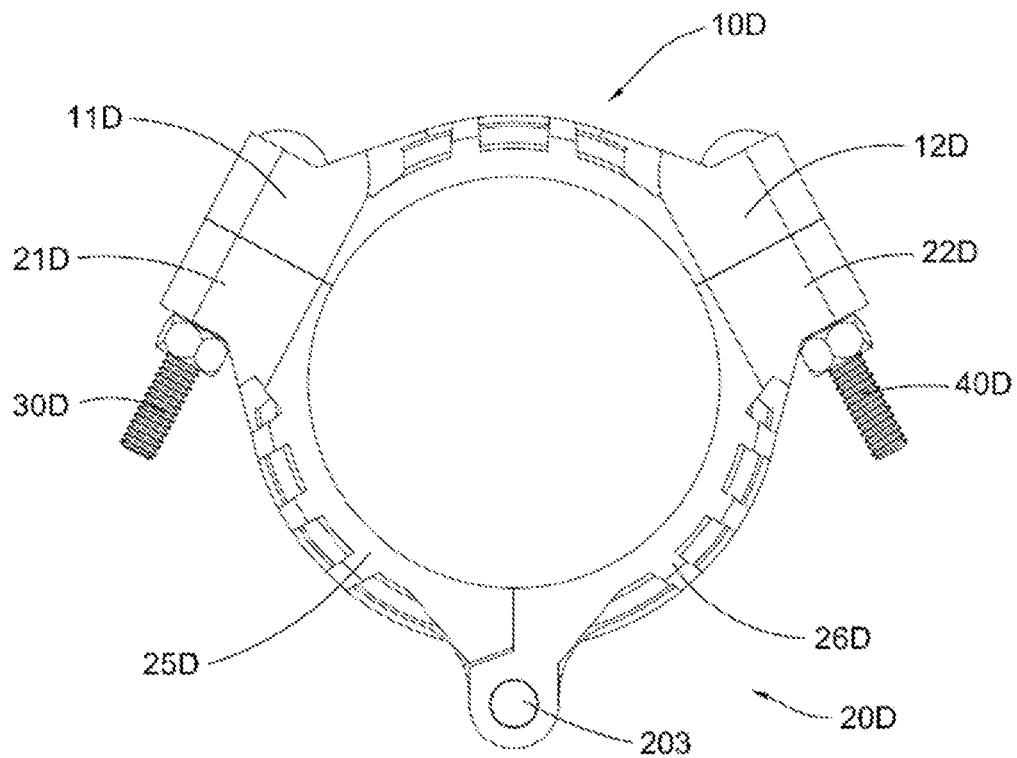
FIG. 22 is a front schematic diagram of a fifth preferred embodiment in the present application in a fastened state.
Figure 23:
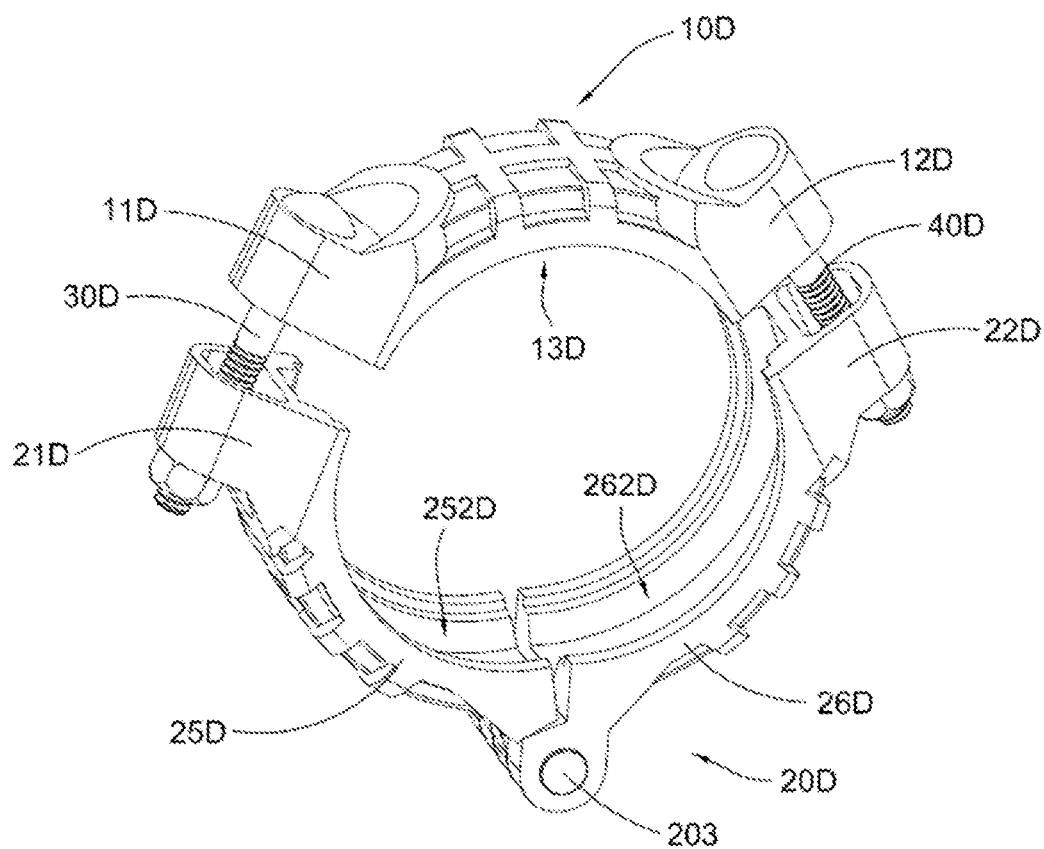
FIG. 23 is a front perspective schematic diagram of a fifth preferred embodiment in the present application.
Figure 24:
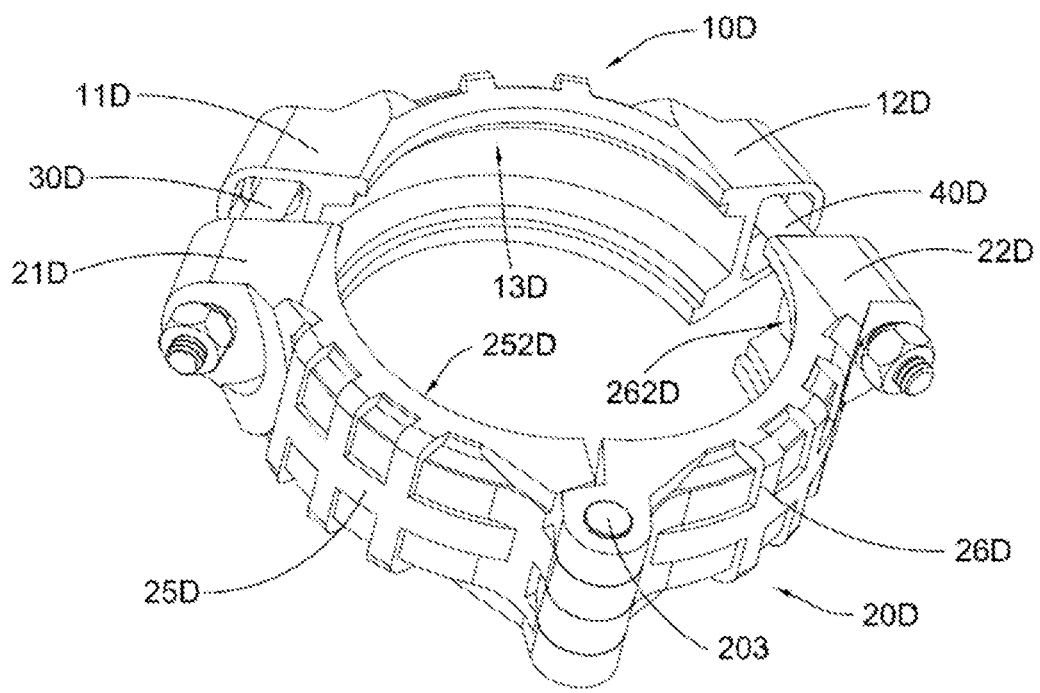
FIG. 24 is a bottom perspective schematic diagram of a fifth preferred embodiment in the present application.
Figure 25:
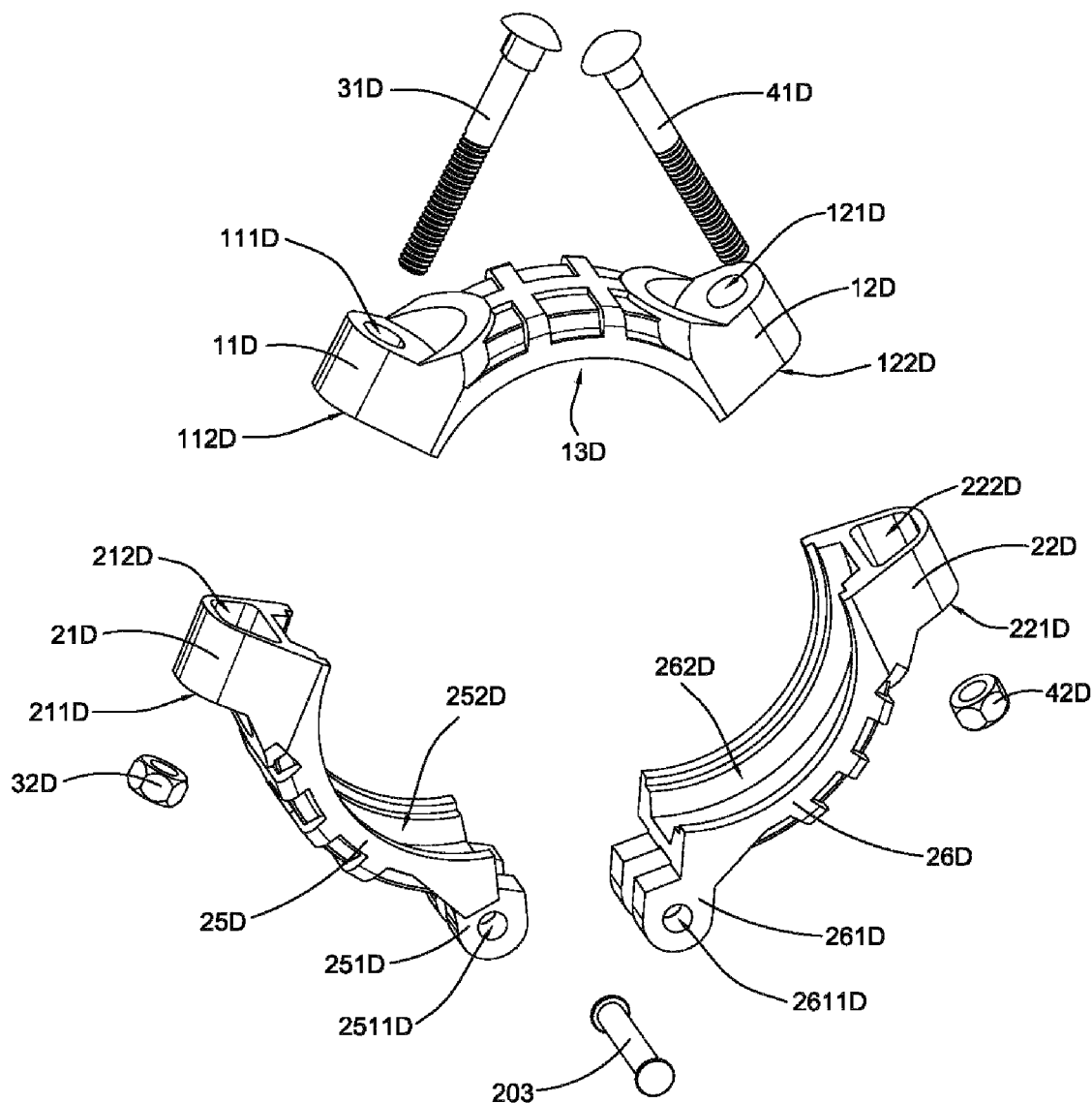
FIG. 25 is an explosion schematic diagram of a fifth preferred embodiment in the present application.
Figure 26:
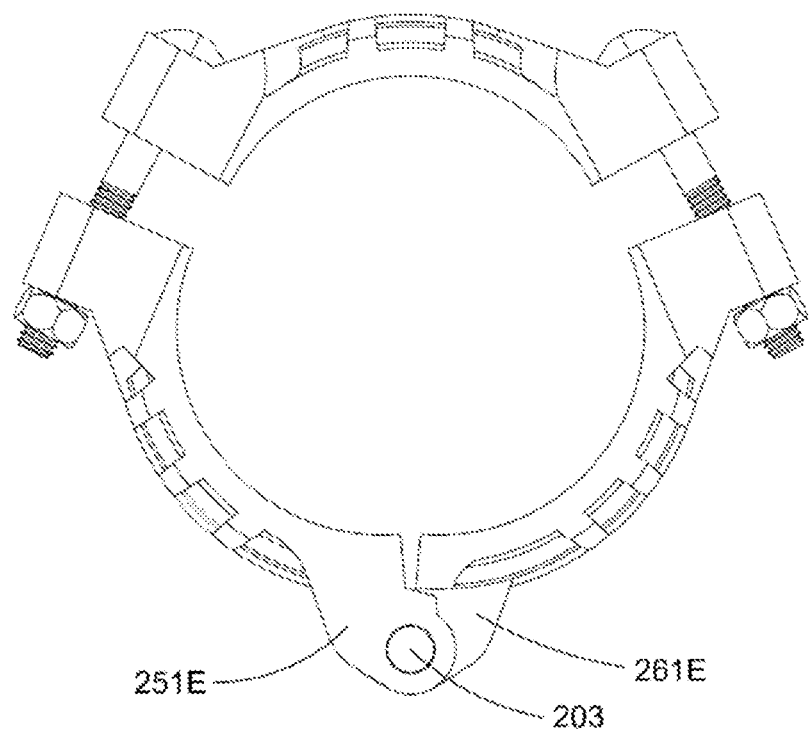
FIG. 26 is a front schematic diagram of a sixth preferred embodiment in the present application in an unfastened state.
Figure 27:
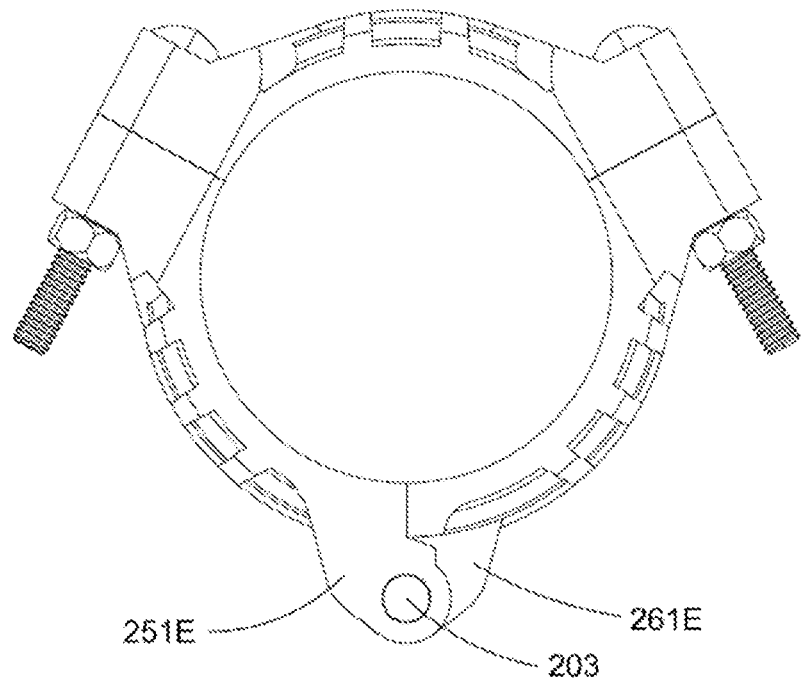
FIG. 27 is a front schematic diagram of a sixth preferred embodiment in the present application in a fastened state.
Figure 28:
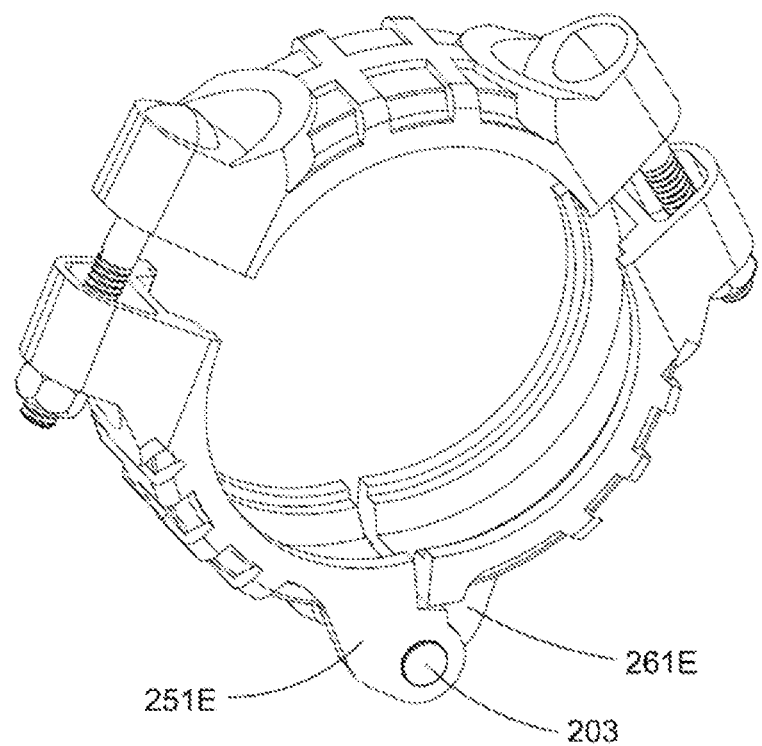
FIG. 28 is a front perspective schematic diagram of a sixth preferred embodiment in the present application.
Figure 29:
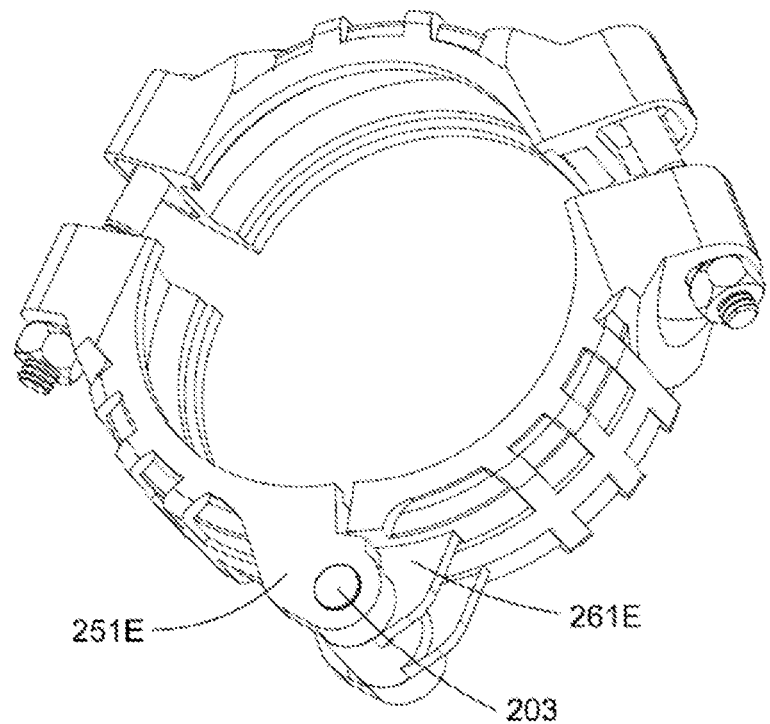
FIG. 29 is a bottom perspective schematic diagram of a sixth preferred embodiment in the present application.
Figure 30:
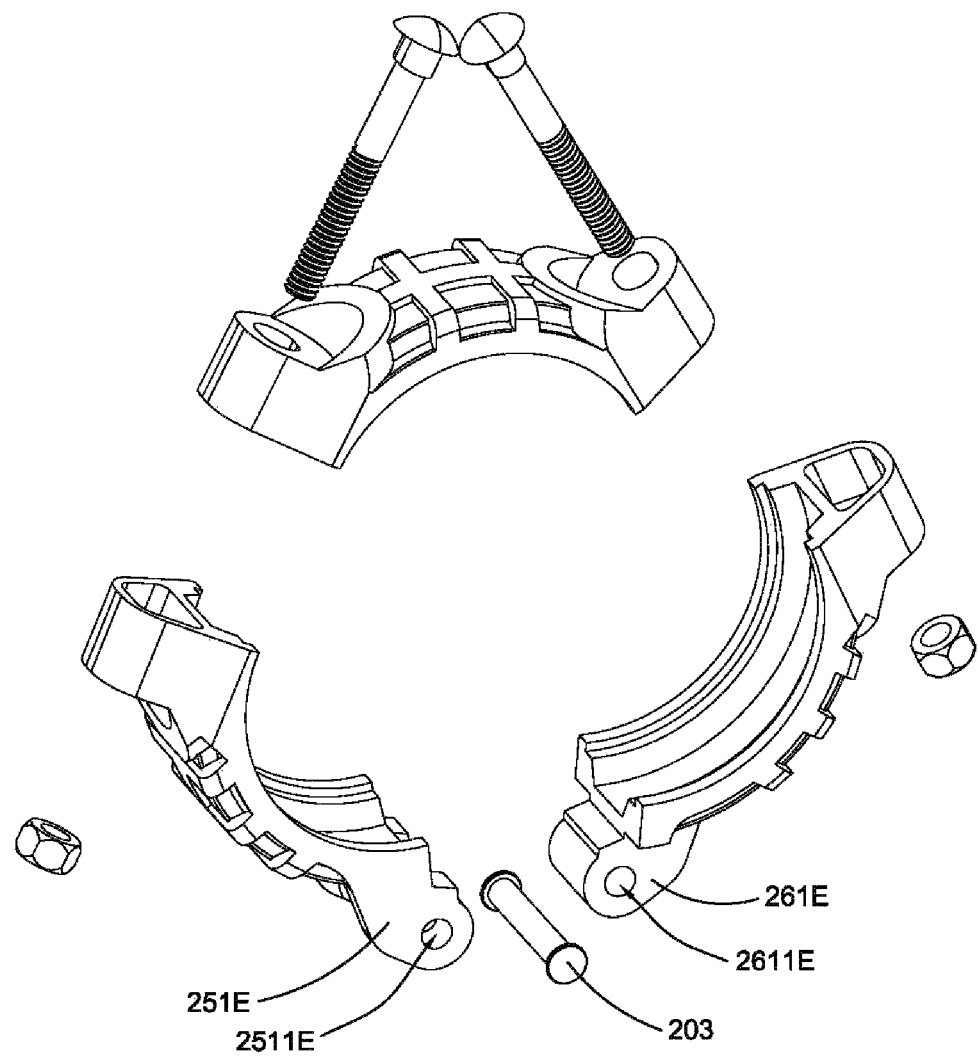
FIG. 30 is an explosion schematic diagram of a sixth preferred embodiment in the present application.

FIGS. 21-25 illustrate a fifth preferred embodiment of the present application. The fifth preferred embodiment includes an arc top ring 10D, an arc bottom ring 20D, a left fastener 30D and a right fastener 40D. The top ring 10D and the bottom ring 20D can be combined together as a whole by fixing the left fastener 30D and the right fastener 40D on two sides respectively, as shown in FIG. 22.

The top ring 10D further includes a top ring left fixing head 11D and a top ring right fixing head 12D. The top ring 10D is provided with a top ring groove 13D on the arc inner side of the top ring 10D. The top ring left fixing head 11D and the top ring right fixing head 12D are on two ends of the top ring 10D respectively. The top ring left fixing head 11D is provided with a top ring left fixing through hole 111D in the middle of the upper end thereof and a top ring left activity groove 112D in the middle of the lower end thereof. The top ring right fixing head 12D is provided with a top ring right fixing through hole 121D in the middle of the upper end thereof and a top ring right activity groove 122D in the middle of the lower end thereof.

The bottom ring 20D further includes a bottom ring left fixing head 21D, a bottom ring right fixing head 22D, an arc bottom ring left part 25D, an arc bottom ring right part 26D and a bottom ring middle shaft member 203. In addition, the bottom ring 20D is provided with a bottom ring groove 23D on the arc inner side of the bottom ring 20D. The bottom ring left part 25D is movably connected to the bottom ring right part 26D.

The bottom ring left fixing head 21D protrudes from the upper end of the bottom ring left part 25D. The bottom ring right fixing head 22D protrudes from the upper end of the bottom ring right part 26D. The bottom ring left fixing head 21D is provided with a bottom ring left fixing through hole 211D positioned in the middle of the lower end thereof, and a bottom ring left activity groove 212D positioned in the middle of the upper end thereof. The bottom ring right fixing head 22D is provided with a bottom ring right fixing through hole 221D positioned in the middle of the lower end thereof, and a bottom ring right activity groove 222D positioned in the middle of the upper end thereof.

The left fastener 30D can be loosely or tightly connected to the top ring left fixing head 11D and the bottom ring left fixing head 21D. The right fastener 40D can also be loosely or tightly connected to the top ring right fixing head 12D and the bottom ring right fixing head 22D.

The left fastener 30D further includes a left bolt 31D and a left nut 32D. The right fastener 40D further includes a right bolt 41D and a right nut 42D. The left bolt 31D penetrates through the top ring left fixing hole 111D of the top ring left fixing head 11D and the bottom ring left fixing hole 211D of the bottom ring left fixing head 21D. The left nut 32D can be mounted on the lower end of the left bolt 31D loosely or tightly. The right bolt 41D penetrates through the top ring right fixing hole 121D of the top ring right fixing head 12D and the bottom ring right fixing hole 221D of the bottom ring right fixing head 22D. The right nut 42D can be mounted on the lower end of the right bolt 41D loosely or tightly.

The bottom ring left part 25D further includes a bottom ring left activity head 251D protruding downwards from the lower end. In addition, the bottom ring left part 25D is provided with a bottom ring left groove 252D positioned on the arc inner side of the bottom ring left part 25D. The bottom ring right part 26D further includes a bottom ring right activity head 261D protruding downwards from the lower end, and the bottom ring right part 26D is provided with a bottom ring right groove 262D positioned on the arc inner side of the bottom ring right part 26D.

Further, the bottom ring left activity head 251D and the bottom ring right activity head 261D are a spaced embedded structure pair, that is, the bottom ring left activity head 251D and the bottom ring right activity head 261D can embedded with each other. The bottom ring left activity head 215D is provided with a bottom ring left activity head connecting hole 2511D. The bottom ring right activity head 261D is provided with a bottom ring right activity head connecting hole 2611D. By mounting the bottom ring middle shaft member 203 in the bottom ring left activity head connecting hole 2511D of the bottom ring left activity head 251D and the bottom ring right activity head connecting hole 2611D of the bottom ring right activity head 261D, the bottom ring left activity head 251D of the bottom ring left part 25D and the bottom ring right activity head 261D of the bottom ring right part 26D form a moveable connection.

FIG. 21 shows the fifth preferred embodiment of the present application in an unfastened state. In the unfastened state, the top ring 10D and the bottom ring 20D are loosely connected together as a whole by the left fastener 30D and the right fastener 40D. At this time, the top ring 10D does not abut to the bottom ring 20D. The bottom left part 25D and the bottom ring right part 26D of the bottom ring 20D are in an unfastened connection state.

At this time, the left bolt 31D can limitedly move between the top ring left activity groove 112D and the bottom ring left activity groove 212D. The right bolt 41D can limitedly move between the top ring right activity groove 122D and the bottom ring right activity groove 222D. The left nut 32D is mounted on the lowest end of the left bolt 31D, and the right nut 42D is mounted on the lowest end of the right bolt 41D.

FIG. 22 shows the fifth preferred embodiment of the present application in a tight state. In the tight state, the left fastener 30D and the right fastener 40D are fastened. The bottom ring left part 25D and the bottom ring right part 26D are tightly jointed due to the stress. The bottom ring left groove 252D of the bottom ring left part 25D and the bottom ring right groove 262D of the bottom ring right part 26D are assembled to form the bottom ring groove 23D. The top ring 10D and the bottom ring 20D are tightly joined due to the stress. The top ring groove 13D of the top ring 10D and the bottom ring groove 23D of the bottom ring 20D are assembled to form an annular groove 50D for fixing the pipes.

In the unfastened state, an end of a pipe or tube to be connected is placed in the annular groove 50D. The end of a pipe or tube to be fixed can be fixed in the annular groove 50D tightly by fastening the left fastener 30D and the right fastener 40D, so as to realize the fast fixing of the pipes or the fittings.

FIGS. 26-30 illustrate a sixth preferred embodiment of the present application. In the sixth preferred embodiment of the present application, the components in the above fifth preferred embodiment are modified.

The bottom ring left activity head 251D is modified to another bottom ring left activity head 251E, and the bottom ring right activity head 261D is modified to another bottom ring right activity head 261E. The bottom ring left activity head 251E is a two-pieces structure, and the bottom ring right activity head 261E is clamped in the bottom ring left activity head 251D. The bottom ring left activity head 251E further provides with a bottom ring left activity head connecting hole 2511E, and the bottom ring right activity head 261E further provides with a bottom ring right activity head connecting hole 2611E. By mounting the bottom ring middle shaft member 203 in the bottom ring left activity head connecting hole 2511E of the bottom ring left activity head 251E and the bottom ring right activity head connecting hole 2611E of the bottom ring right activity head 261E. The bottom ring left activity head 251E and the bottom ring right activity head 261E form a moveable connection.

With the modifications of the above components, the sixth preferred embodiment may realize the same or the similar effect with the fifth preferred embodiment.

Figure 31:
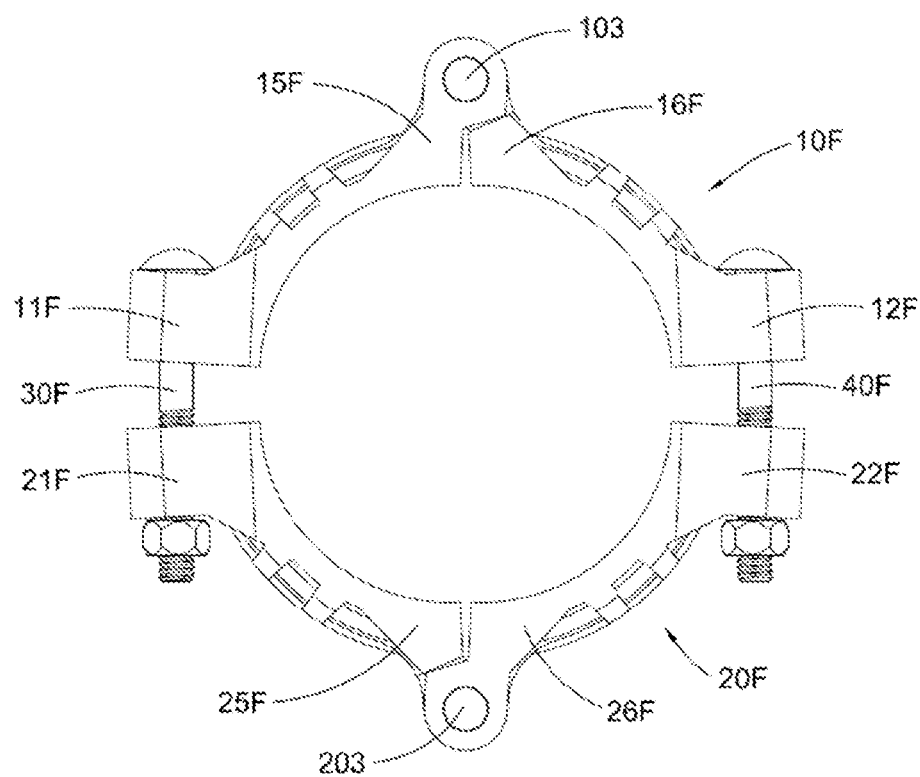
FIG. 31 is a front schematic diagram of a seventh preferred embodiment in the present application in an unfastened state.
Figure 32:
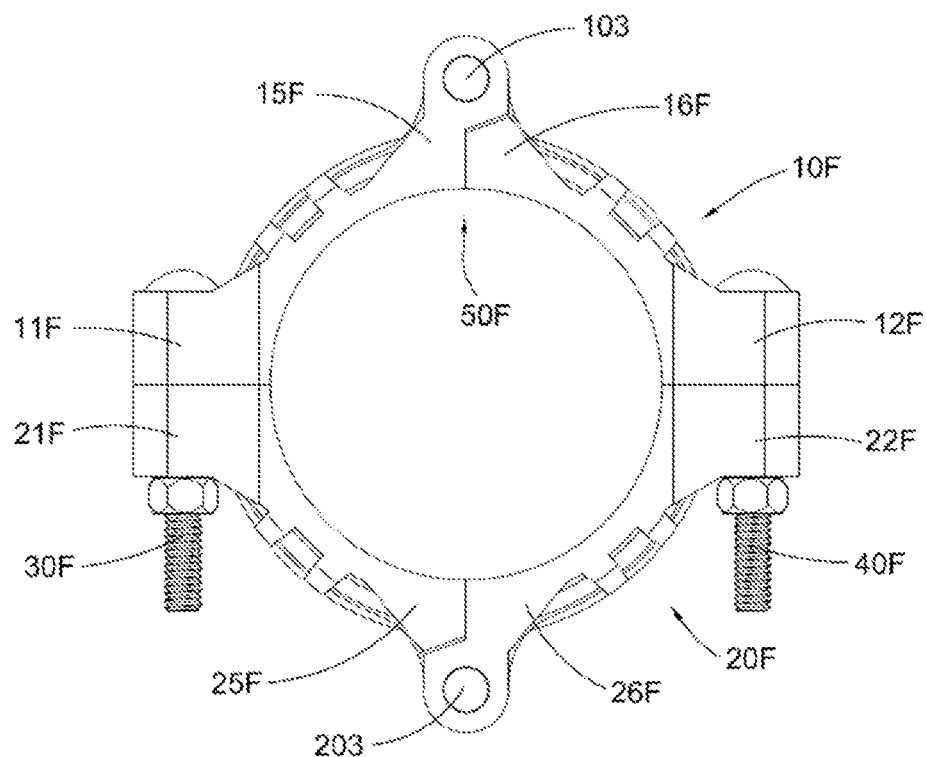
FIG. 32 is a front schematic diagram of a seventh preferred embodiment in the present application in a fastened state.
Figure 33:
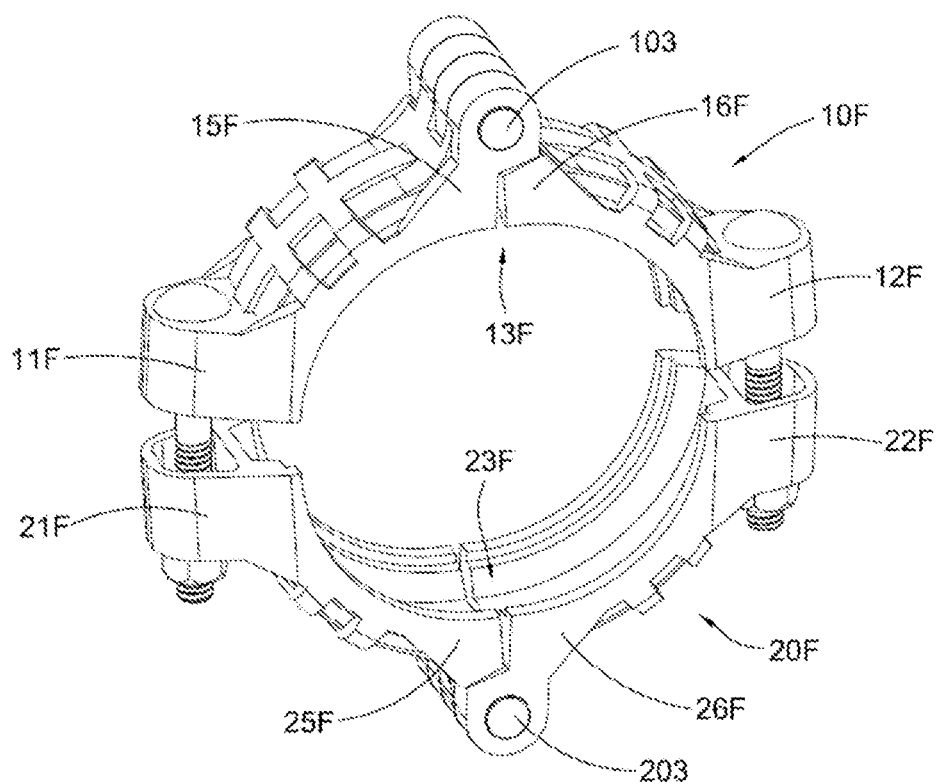
FIG. 33 is a front perspective schematic diagram of a seventh preferred embodiment in the present application.
Figure 34:
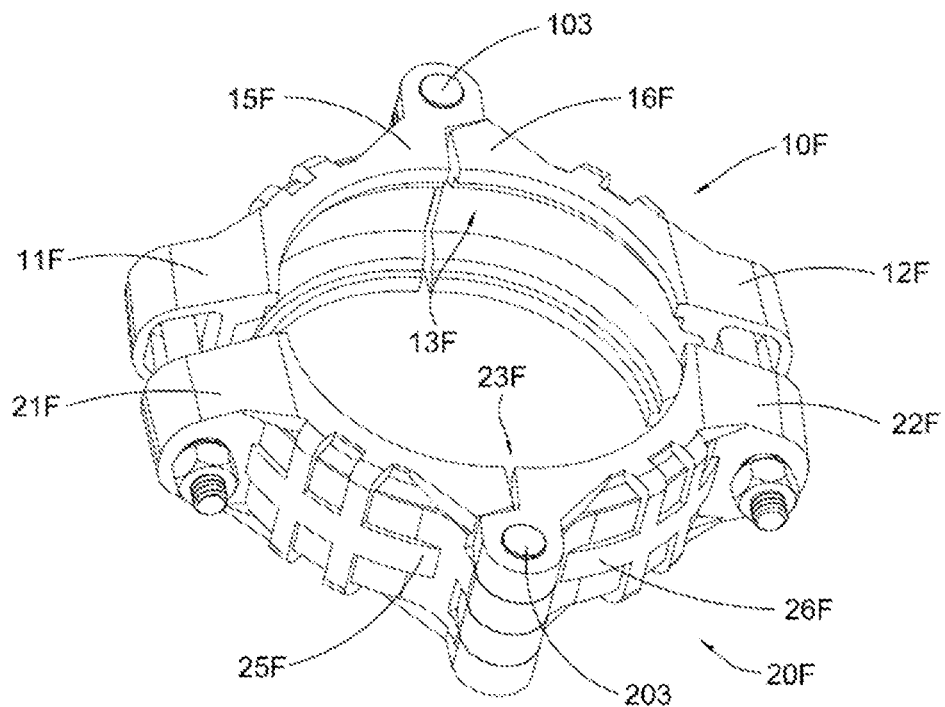
FIG. 34 is a bottom perspective schematic diagram of a seventh preferred embodiment in the present application.
Figure 35:
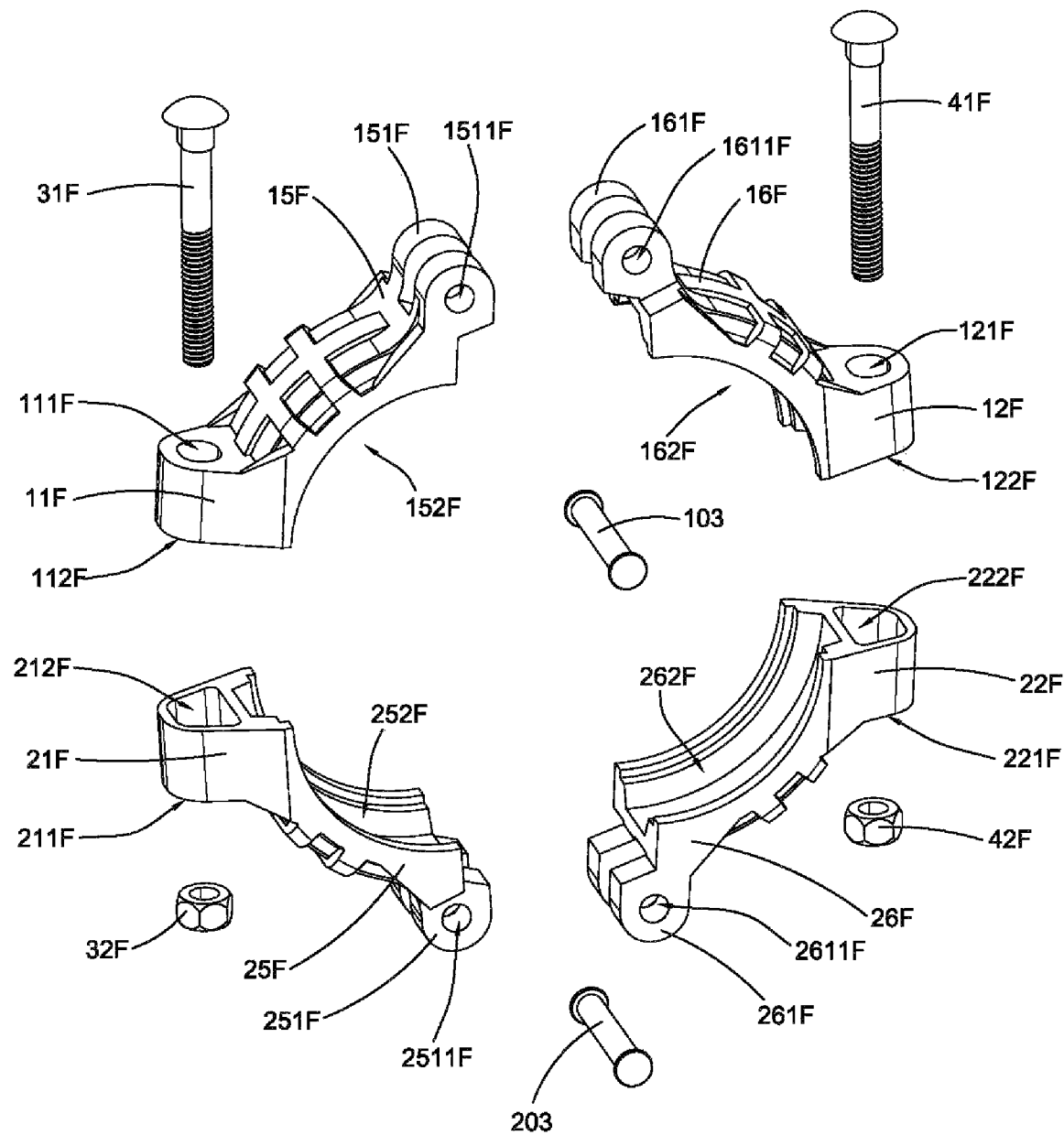
FIG. 35 is an explosion schematic diagram of a seventh preferred embodiment in the present application.
Figure 36:
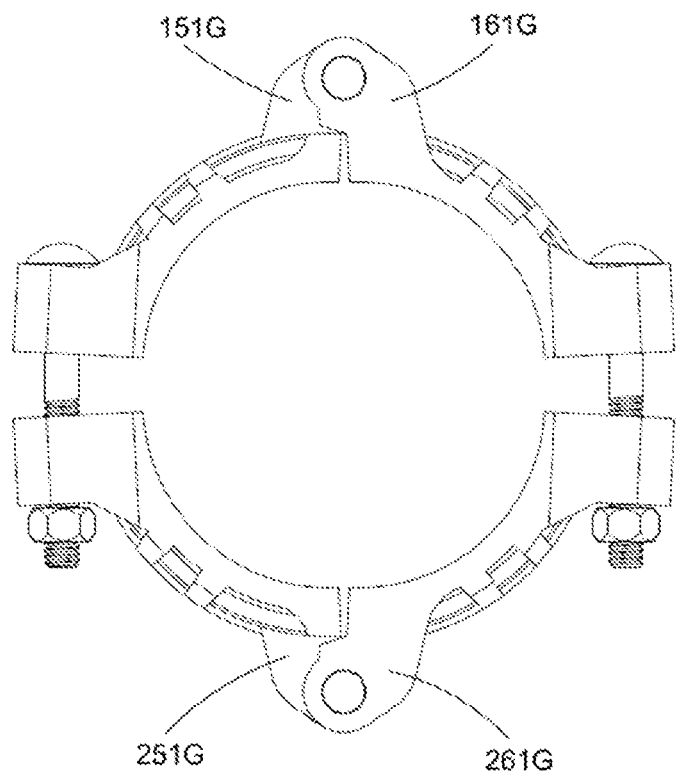
FIG. 36 is a front schematic diagram of an eighth preferred embodiment in the present application in an unfastened state.
Figure 37:
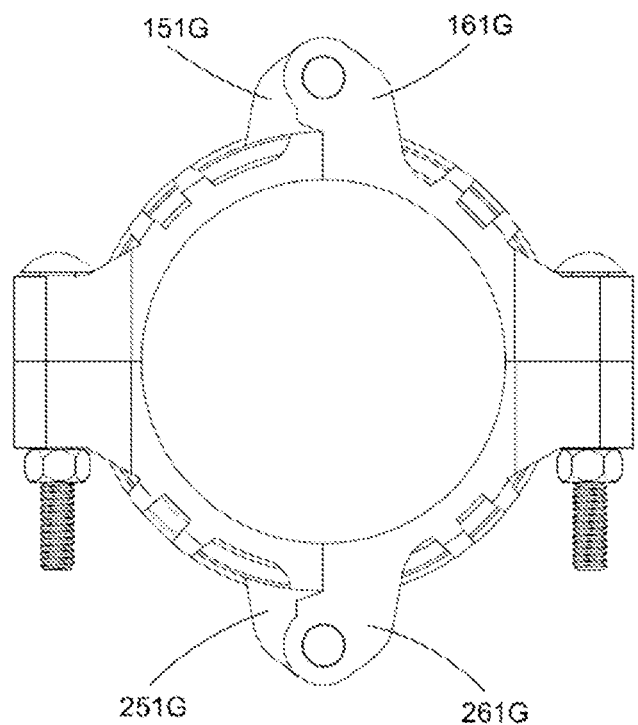
FIG. 37 is a front schematic diagram of an eighth preferred embodiment in the present application in a fastened state.
Figure 38:
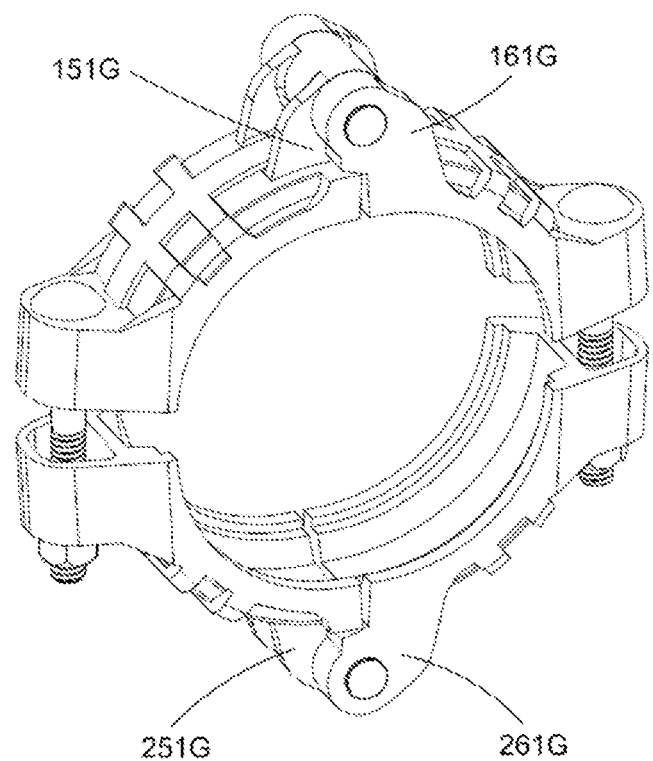
FIG. 38 is a front perspective schematic diagram of an eighth preferred embodiment in the present application.
Figure 39:
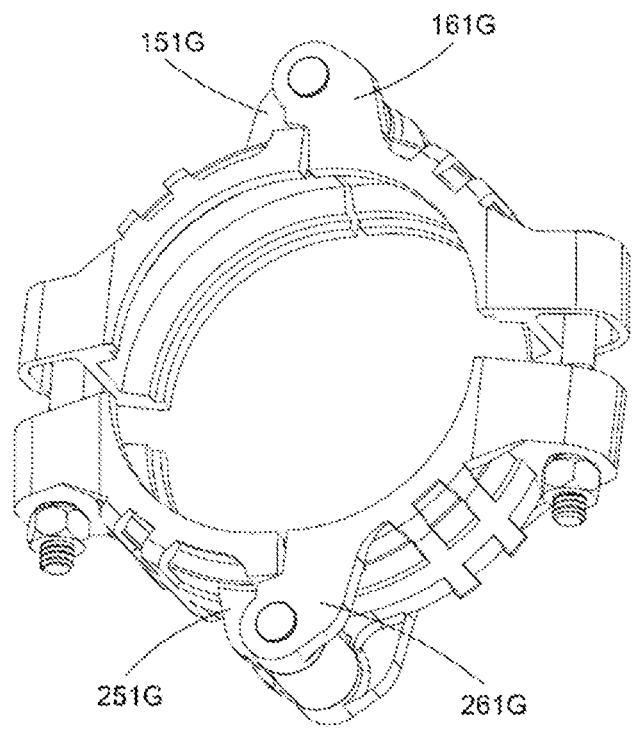
FIG. 39 is a bottom perspective schematic diagram of an eighth preferred embodiment in the present application.
Figure 40:
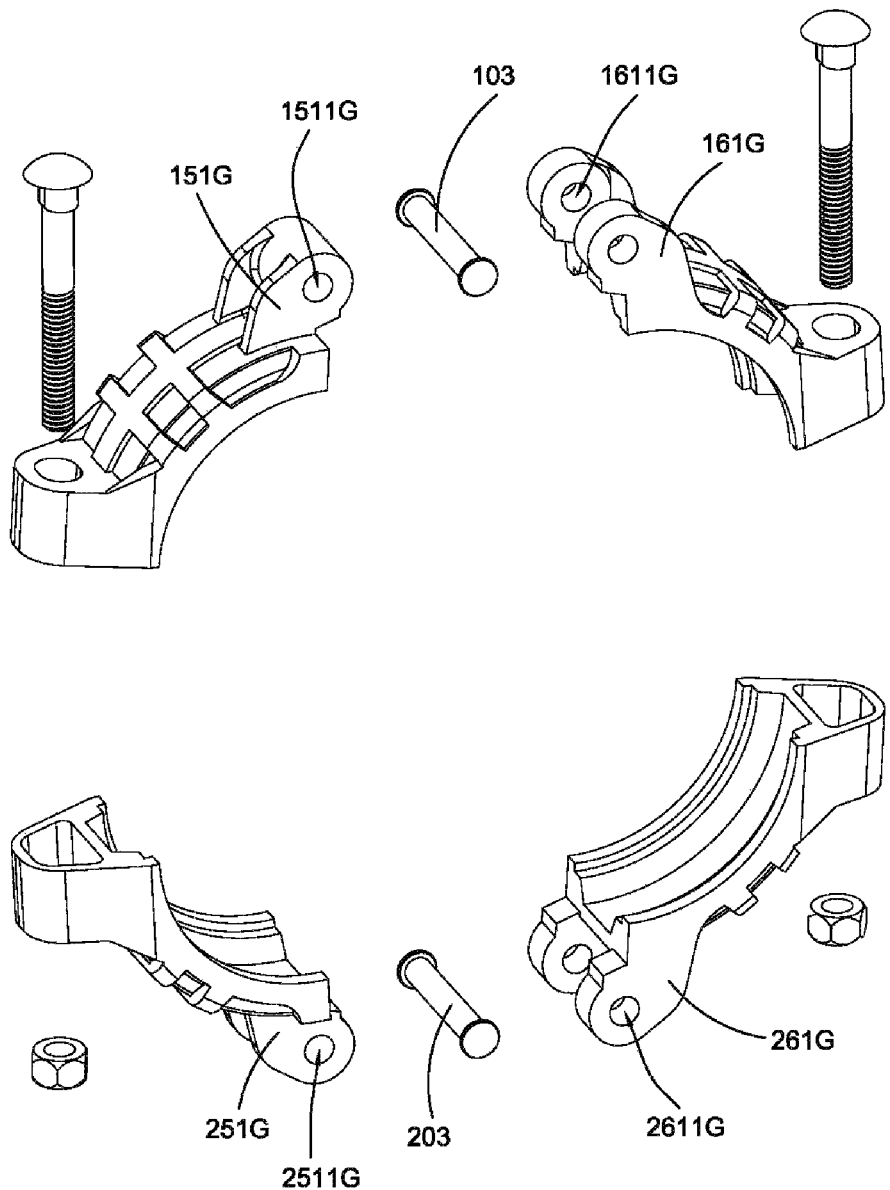
FIG. 40 is an explosion schematic diagram of an eighth preferred embodiment in the present application.

FIGS. 31-35 illustrate a seventh preferred embodiment of the present application. The seventh preferred embodiment includes an arc top ring 10F, an arc bottom ring 20F, a left fastener 30F and a right fastener 40F. The top ring 10F and the bottom ring 20F can be combined together as a whole by fixing the left fastener 30F and the right fastener 40F on two sides respectively, as shown in FIG. 32.

The top ring 10F further includes a top ring left fixing head 11F, a top ring right fixing head 12F, a top ring left part 15F, a top ring right part 16F and a top ring middle shaft member 103. In addition, the top ring 10F is provided with a top ring groove 13F on the arc inner side of the top ring 10F. The top ring left part 15F is movably connected to the top ring right part 16F.

The top ring left fixing head 11F protrudes from the lower end of the top ring left part 15F. The top ring right fixing head 12F protrudes from the lower end of the top ring right part 16F. The top ring left fixing head 11F is provided with a top ring left fixing through hole 111F positioned in the middle of the upper end thereof, and a top ring left activity groove 112F positioned in the middle of the lower end thereof. The top ring right fixing head 12F is provided with a top ring right fixing through hole 121F positioned in the middle of the upper end thereof, and a top ring right activity groove 122F positioned in the middle of the lower end thereof.

The bottom ring 20F further includes a bottom ring left fixing head 21F, a bottom ring right fixing head 22F, an arc bottom ring left part 25F, an arc bottom ring right part 26F and a bottom ring middle shaft member 203. The bottom ring 20F is provided with a bottom ring groove 23F on the arc inner side of the bottom ring 20F. The bottom ring left part 25F is movably connected to the bottom ring right part 26F.

The bottom ring left fixing head 21F protrudes from the upper end of the bottom ring left part 25F. The bottom ring right fixing head 22F protrudes from the upper end of the bottom ring right part 26F. The bottom ring left fixing head 21F is provided with a bottom ring left fixing through hole 211F positioned in the middle of the lower end thereof, and a bottom ring left activity groove 212F positioned in the middle of the upper end thereof. The bottom ring right fixing head 22F is provided with a bottom ring right fixing through hole 221F positioned in the middle of the lower end thereof, and a bottom ring right activity groove 222F positioned in the middle of the upper end thereof.

The left fastener 30F can be loosely or tightly connected to the top ring left fixing head 11F and the bottom ring left fixing head 21F. The right fastener 40F can also be loosely or tightly connected to the top ring right fixing head 12F and the bottom ring right fixing head 22F.

The left fastener 30F further includes a left bolt 31F and a left nut 32F. The right fastener 40F further includes a right bolt 41F and a right nut 42F. The left bolt 31F penetrates through the top ring left fixing hole 111F of the top ring left fixing head 11F and the bottom ring left fixing hole 211F of the bottom ring left fixing head 21F. The left nut 32F can be mounted on the lower end of the left bolt 31F loosely or tightly. The right bolt 41F penetrates through the top ring right fixing hole 121F of the top ring right fixing head 12F and the bottom ring right fixing hole 221F of the bottom ring right fixing head 22F. The right nut 42F can be mounted on the lower end of the right bolt 41F loosely or tightly.

The top ring left part 15F further includes a top ring left activity head 151F protruding upwards from the upper end. In addition, the top ring left part 15F is provided with a top ring left groove 152F positioned on the arc inner side of the top ring left part 15F. The top ring right part 16F further includes a top ring right activity head 161F protruding upwards from the upper end, and the top ring right part 16F is provided with a top ring right groove 162F positioned on the arc inner side of the top ring right part 16F.

Further, the top ring left activity head 151F and the top ring right activity head 161F are a spaced embedded structure pair, that is, the top ring left activity head 151F and the top ring right activity head 161F can embedded with each other. The top ring left activity head 115F is provided with a top ring left activity head connecting hole 1511F. The top ring right activity head 161F is provided with a top ring right activity head connecting hole 1611F. By mounting the top ring middle shaft member 103 in the top ring left activity head connecting hole 1511F of the top ring left activity head 151F and the top ring activity head connecting hole 1611F of the top ring right activity head 161F, the top ring left activity head 151F of the top ring left part 15F and the top ring right activity head 161F of the top ring right part 16F form a moveable connection.

The bottom ring left part 25F further includes a bottom ring left activity head 251F protruding downwards from the lower end. In addition, the bottom ring left part 25F is provided with a bottom ring left groove 252F positioned on the arc inner side of the bottom ring left part 25F. The bottom ring right part 26F further includes a bottom ring right activity head 261F protruding downwards from the lower end, and the bottom ring right part 26F is provided with a bottom ring right groove 262F positioned on the arc inner side of the bottom ring right part 26F.

Further, the bottom ring left activity head 251F and the bottom ring right activity head 261F are a spaced embedded structure pair, that is, the bottom ring left activity head 251F and the bottom ring right activity head 261F can embedded with each other. The bottom ring left activity head 215F is provided with a bottom ring left activity head connecting hole 2511F. The bottom ring right activity head 261F is provided with a bottom ring right activity head connecting hole 2611F. By mounting the bottom ring middle shaft member 203 in the bottom ring left activity head connecting hole 2511F of the bottom ring left activity head 251F and the bottom ring right activity head connecting hole 2611F of the bottom ring right activity head 261F, the bottom ring left activity head 251F of the bottom ring left part 25F and the bottom ring right activity head 261F of the bottom ring right part 26F form a moveable connection.

FIG. 31 shows the seventh preferred embodiment of the present application in an unfastened state. In the unfastened state, the top ring 10F and the bottom ring 20F are loosely connected together as a whole by the left fastener 30F and the right fastener 40F. At this time, the top ring 10F does not abut to the bottom ring 20F. The top left part 15F and the top ring right part 16F of the bottom ring 20D are in an unfastened connection state, and the bottom ring left part 25F and the bottom ring right part 26F of the bottom ring 20F are in an unfastened connection state.

At this time, the left bolt 31F can limitedly move between the top ring left activity groove 112F and the bottom ring left activity groove 212F. The right bolt 41F can limitedly move between the top ring right activity groove 122F and the bottom ring right activity groove 222F. The left nut 32F is mounted on the lowest end of the left bolt 31F, and the right nut 42F is mounted on the lowest end of the right bolt 41F.

FIG. 32 shows the seventh preferred embodiment of the present application in a tight state. In the tight state, the left fastener 30F and the right fastener 40F are fastened. The top ring left part 15F and the top ring right part 16F are tightly jointed due to the stress. The top ring left groove 152F of the top ring left part 15F and the top ring right groove 162F of the top ring right part 16F are assembled to form the top ring groove 13F. The bottom ring left part 25F and the bottom ring right part 26F are tightly jointed due to the stress. The bottom ring left groove 252F of the bottom ring left part 25F and the bottom ring right groove 262F of the bottom ring right part 26F are assembled to form the bottom ring groove 23F. The top ring 10F and the bottom ring 20F are tightly joined due to the stress. The top ring groove 13F of the top ring 10F and the bottom ring groove 23F of the bottom ring 20F are assembled to form an annular groove 50F for fixing the pipes or fittings.

In the unfastened state, the end of the connecting pipe or the fitting is placed in the annular groove 50F. The end of the to-be-fixed pipe or fixing can be fixed in the annular groove 50F tightly by fastening the left fastener 30F and the right fastener 40F, so as to realize the fast fixing of the pipes or the fittings.

FIGS. 36-40 illustrate an eighth preferred embodiment of the present application. In the eighth preferred embodiment of the present application, the components in the above seventh preferred embodiment are modified.

The top ring left activity head 151F is modified to another top ring left activity head 151G, and the top ring right activity head 161F is modified to another top ring right activity head 161G. The top ring right activity head 161G is a two-pieces structure, and the top ring left activity head 151G is clamped in the top ring right activity head 161G. The top ring left activity head 151G further provides with a top ring left activity head connecting hole 1511G, and the top ring right activity head 161G further provides with a top ring right activity head connecting hole 1611G. By mounting the top ring middle shaft member 103 in the top ring left activity head connecting hole 1511G of the top ring left activity head 151G and the top ring right activity head connecting hole 1611G of the top ring right activity head 161G. The top ring left activity head 151G and the top ring right activity head 161G form a moveable connection.

The bottom ring left activity head 251F is modified to another bottom ring left activity head 251G, and the bottom ring right activity head 261F is modified to another bottom ring right activity head 261G. The bottom ring right activity head 261G is a two-pieces structure, and the bottom ring left activity head 251G is clamped in the bottom ring right activity head 261G. The bottom ring left activity head 251G further provides with a bottom ring left activity head connecting hole 2511G, and the bottom ring right activity head 261G further provides with a bottom ring right activity head connecting hole 2611G. By mounting the bottom ring middle shaft member 203 in the bottom ring left activity head connecting hole 2511G of the bottom ring left activity head 251G and the bottom ring right activity head connecting hole 2611G of the bottom ring right activity head 261G. The bottom ring left activity head 251G and the bottom ring right activity head 261G form a moveable connection.

With the modifications of the above components, the eighth preferred embodiment may realize the same or the similar effect with the seventh preferred embodiment.

Since the present application has described multiple embodiments, it is not intended to limit the present application to the above embodiments. Without departing from the above principles, the embodiments of the present application may have any deformation or modification, including but not limited to replacing materials, modifying structure, changing appearance, adjusting size, etc., and these deformations should be included in the spirit of the present application.

What is claimed is:
1. A quick coupler for coupling with pipes, comprising:
a top ring, a bottom ring, and fasteners;
wherein the top ring and the bottom ring are configured to be assembled together; the top ring is provided with a top ring groove, and the bottom ring is provided with a bottom ring groove; the fasteners are loosely or tightly connected to the top ring and the bottom ring, so that the top ring and the bottom ring are assembled together as a whole; in a tight state, the top ring groove of the top ring and the bottom ring groove of the bottom ring are assembled to form an annular groove for fixing pipes,
wherein the top ring is an arc member, and further comprises a top ring left fixing head and a top ring right fixing head; the top ring left fixing head and the top ring right fixing head are positioned on two ends of the top ring respectively; the top ring groove is positioned on an arc inner side of the top ring; the bottom ring is an arc member, and further comprises a bottom ring left fixing head and a bottom ring right fixing head, the bottom ring left fixing head and the bottom ring right fixing head are on two ends of the bottom ring respectively; the bottom ring groove is positioned on an arc inner side of the bottom ring; the fasteners comprise a left fastener and a right fastener, the left fastener is loosely or tightly connected to the top ring left fixing head and the bottom ring left fixing head, and the right fastener is loosely or tightly connected to the top ring right fixing head and the bottom ring right fixing head,
wherein the top ring further comprises a top ring left part, a top ring middle part and a top ring right part; and the bottom ring further comprises a bottom ring left part, a bottom ring middle part and a bottom ring right part,
wherein the top ring left part comprises a top ring left activity head protruding upwards from an upper end of the top ring left part, and the top ring right part comprises a top ring right activity head protruding upwards from an upper end of the top ring right part,
wherein the bottom ring left part comprises a bottom ring left activity head protruding downwards from a lower end of the bottom ring left part, and the bottom ring right part comprises a bottom ring right activity head protruding downwards from a lower end of the bottom ring right part,
wherein the top ring middle part is provided with a top ring middle groove positioned on an arc inner side of the top ring middle part, the top ring left part is provided with a top ring left groove positioned on an arc inner side of the top ring left part, the top ring right part is provided with a top ring right groove positioned on an arc inner side of the top ring right part,
wherein the bottom ring middle part is provided with a bottom ring middle groove on an arc inner side of the bottom ring middle part, the bottom ring left part is provided with a bottom ring left groove positioned on an arc inner side of the bottom ring left part, the bottom ring right part is provided with a bottom ring right groove positioned on an arc inner side of the bottom ring right part,
wherein when the left fastener and the right fastener are fastened into the tight state, the top ring middle part, the top ring left part and the top ring right part of the top ring are tightly jointed in a manner that adjacent ends thereof come in contact with each other, the bottom ring middle part, the bottom ring left part and the bottom ring right part of the bottom ring are tightly jointed in a manner that adjacent ends thereof come in contact with each other, so as to allow the top ring middle groove of the top ring middle part, the top ring left groove of the top ring left part and the top ring right groove of the top ring right part to be assembled to form the top ring groove of the top ring and to allow the bottom ring middle groove of the bottom ring middle part, the bottom ring left groove of the bottom ring left part and the bottom ring right groove of the bottom ring right part to be assembled to form the bottom ring groove of the bottom ring, adjacent ends of the top ring left part and bottom ring left part come in contact with each other, and adjacent ends of the top ring right part and bottom ring right part come in contact with each other, such that the top ring groove of the top ring and the bottom ring groove of the bottom ring form a continual sealed annular groove.

2. The quick coupler according to claim 1, wherein the bottom ring further comprises a bottom ring left shaft member and a bottom ring right shaft member, the bottom ring left shaft member is mounted at a connection joint of the bottom ring left part and the bottom ring middle part, the bottom ring right shaft member is mounted at a connection joint of the bottom ring right part and the bottom ring middle part; the left fastener further comprises a left bolt and a left nut, and the right fastener further comprises a right bolt and a right nut.

3. The quick coupler according to claim 1, wherein the bottom ring further comprises a bottom ring left shaft member and a bottom ring right shaft member, the bottom ring left shaft member is mounted at a connection joint of the bottom ring left part and the bottom ring middle part, the bottom ring right shaft member is mounted at a connection joint of the bottom ring right part and the bottom ring middle part; the top ring further comprises a top ring left shaft member and a top ring right shaft member, the top ring left shaft member is mounted at a connection joint of the top ring left part and the top ring middle part, the top ring right shaft member is mounted at a connection joint of the top ring right part and the top ring middle part; the left fastener further comprises a left bolt and a left nut, and the right fastener further comprises a right bolt and a right nut.

4. The quick coupler according to claim 3, wherein the top ring middle part comprises a top ring left activity base and a top ring right activity base on two ends of the top ring middle part respectively, and the bottom ring middle part comprises a bottom ring left activity base and a bottom ring right activity base on two ends of the bottom ring middle part respectively; wherein the top ring left activity base, the top ring left activity head, the top ring right activity base, the top ring right activity head, the bottom ring left activity base, the bottom ring left activity head, the bottom ring right activity base and the bottom ring right activity head each have a two-piece structure, so that the top ring left part and the top ring right part are movably connected to the two ends of the top ring middle part by the top ring left shaft member and the top ring right shaft member respectively, and the bottom ring left part and the bottom ring right part are movably connected to the two ends of the bottom ring middle part by the bottom ring left shaft member and the bottom ring right shaft member respectively.

5. The quick coupler according to claim 1, wherein the top ring left fixing head is protruded from a lower end of the top ring left part, the top ring right fixing head is protruded from a lower end of the top ring right part, the top ring left fixing head is provided with a top ring left fixing through hole positioned at an upper end thereof, and a top ring left activity groove positioned at a lower end thereof, the top ring right fixing head is provided with a top ring right fixing through hole positioned at an upper end thereof, and a top ring right activity groove positioned at a lower end thereof; wherein the bottom ring left fixing head is protruded from an upper end of the bottom ring left part, the bottom ring right fixing head is protruded from an upper end of the bottom ring right part, the bottom ring left fixing head is provided with a bottom ring left fixing through hole positioned at a lower end there of, and a bottom ring left activity groove positioned at an upper end thereof, the bottom ring right fixing head is provided with a bottom ring right fixing through hole positioned at a lower end thereof, and a bottom ring right activity groove positioned at an upper end thereof; wherein the left fastener is connected to the top ring left fixing head and the bottom ring left fixing head by passing through the top ring left fixing through hole, the top ring left activity groove, the bottom ring left activity groove, and the bottom ring left fixing through hole; wherein the right fastener is connected to the top ring right fixing head and the bottom ring right fixing head by passing through the top ring right fixing through hole, top ring right activity groove, the bottom ring right activity groove and the bottom ring right fixing through hole, wherein the top ring left activity groove and the bottom ring left activity groove are configured to be sized to allow movement of the left fastener, and wherein the top ring right activity groove and the bottom ring right activity groove are configured to be sized to allow movement of the right fastener.

6. A quick coupler for coupling with pipes, comprising:
a top ring, a bottom ring, and fasteners;
wherein the top ring and the bottom ring are configured to be assembled together; the top ring is provided with a top ring groove, and the bottom ring is provided with a bottom ring groove; the fasteners are loosely or tightly connected to the top ring and the bottom ring, so that the top ring and the bottom ring are assembled together as a whole; in a tight state, the top ring groove of the top ring and the bottom ring groove of the bottom ring are assembled to form an annular groove which is a continual sealed annular groove for fixing pipes,
wherein the bottom ring further comprises a bottom ring left part, a bottom ring middle part and a bottom ring right part, and the bottom ring left part and the bottom ring right part are movably connected to two ends of the bottom ring middle part respectively, wherein the bottom ring middle part is provided with a bottom ring middle groove on an arc inner side of the bottom ring middle part, the bottom ring left part is provided with a bottom ring left groove positioned on an arc inner side of the bottom ring left part, the bottom ring right part is provided with a bottom ring right groove positioned on an arc inner side of the bottom ring right part,
wherein when the fasteners are fastened to fasten the top ring with the bottom ring, the bottom ring middle part, the bottom ring left part and the bottom ring right part of the bottom ring are tightly jointed in a manner that adjacent ends thereof come in contact with each other, so as to allow the bottom ring middle groove of the bottom ring middle part, the bottom ring left groove of the bottom ring left part and the bottom ring right groove of the bottom ring right part are assembled to form the bottom ring groove of the bottom ring, the bottom ring left part and the bottom ring right part come in contact with the top ring, such that the top ring groove of the top ring and the bottom ring groove of the bottom ring form the continual sealed annular groove at an inner side of the quick coupler.

7. The quick coupler according to claim 6, wherein the bottom ring further comprises a bottom ring left shaft member and a bottom ring right shaft member, the bottom ring left shaft member is mounted at a connection joint of the bottom ring left part and the bottom ring middle part, the bottom ring right shaft member is mounted at a connection joint of the bottom ring right part and the bottom ring middle part; wherein the fasteners comprises a left fastener and a left fastener, the left fastener comprises a left bolt and a left nut, and the right fastener comprises a right bolt and a right nut.

8. The quick coupler according to claim 7, wherein the top ring further comprises a top ring left fixing head and a top ring right fixing head positioned on two ends of the top ring respectively; the bottom ring further comprises a bottom ring left fixing head and a bottom ring right fixing head positioned are on two ends of the bottom ring respectively; the top ring left fixing head is provided with a top ring left fixing through hole positioned at an upper end thereof, and a top ring left activity groove positioned at a lower end thereof, the top ring right fixing head is provided with a top ring right fixing through hole positioned at an upper end thereof, and a top ring right activity groove positioned at a lower end thereof; wherein the bottom ring left fixing head is provided with a bottom ring left fixing through hole positioned at a lower end thereof, and a bottom ring left activity groove positioned at an upper end thereof, the bottom ring right fixing head is provided with a bottom ring right fixing through hole positioned at a lower end thereof, and a bottom ring right activity groove positioned at an upper end thereof; wherein the left fastener is connected to the top ring left fixing head and the bottom ring left fixing head by passing through the top ring left fixing through hole, the top ring left activity groove, the bottom ring left activity groove, and the bottom ring left fixing through hole; wherein the right fastener is connected to the top ring right fixing head and the bottom ring right fixing head by passing through the top ring right fixing through hole, top ring right activity groove, the bottom ring right activity groove and the bottom ring right fixing through hole, wherein the top ring left activity groove and the bottom ring left activity groove are configured to be sized to couple with the left bolt to allow movement of the left bolt, and wherein the top ring right activity groove and the bottom ring right activity groove are configured to couple with the right bolt to allow movement of the right bolt.

9. A quick coupler for coupling with pipes, comprising: a top ring, a bottom ring, and fasteners;
wherein the top ring and the bottom ring are configured to be assembled together; the top ring is provided with a top ring groove, and the bottom ring is provided with a bottom ring groove; the fasteners are loosely or tightly connected to the top ring and the bottom ring, so that the top ring and the bottom ring are assembled together as a whole; in a tight state, the top ring groove of the top ring and the bottom ring groove of the bottom ring are assembled to form an annular groove which is a continual sealed annular groove for fixing pipes,
wherein the top ring comprises a top ring left part, a top ring middle part and a top ring right part, and the top ring left part and the top ring right part are movably connected to two ends of the top ring middle part respectively, wherein the top ring middle part is provided with a top ring middle groove positioned on an arc inner side of the top ring middle part, the top ring left part is provided with a top ring left groove positioned on an arc inner side of the top ring left part, the top ring right part is provided with a top ring right groove positioned on an arc inner side of the top ring right part,
wherein when the fasteners are fastened to fasten the top ring with the bottom ring, the top ring middle part, the top ring left part and the top ring right part of the top ring are tightly jointed in a manner that adjacent ends thereof come in contact with each other, so as to allow the top ring middle groove of the top ring middle part, the top ring left groove of the top ring left part and the top ring right groove of the top ring right part are assembled to form the top ring groove of the top ring, the top ring left part and the top ring part of the top ring come in contact with the bottom ring, so that the top ring groove of the top ring and the bottom ring groove of the bottom ring form a continual sealed annular groove at an inner side of the quick coupler.

10. The quick coupler according to claim 9, wherein the top ring further comprises a top ring left shaft member and a top ring right shaft member, the top ring left shaft member is mounted at a connection joint of the top ring left part and the top ring middle part, the top ring right shaft member is mounted at a connection joint of the top ring right part and the top ring middle part; the left fastener further comprises a left bolt and a left nut, and the right fastener further comprises a right bolt and a right nut.

11. The quick coupler according to claim 10, wherein the top ring further comprises a top ring left fixing head and a top ring right fixing head positioned on two ends of the top ring respectively; the bottom ring further comprises a bottom ring left fixing head and a bottom ring right fixing head positioned are on two ends of the bottom ring respectively; the top ring left fixing head is provided with a top ring left fixing through hole positioned at an upper end thereof, and a top ring left activity groove positioned at a lower end thereof, the top ring right fixing head is provided with a top ring right fixing through hole positioned at an upper end thereof, and a top ring right activity groove positioned at a lower end thereof; wherein the bottom ring left fixing head is provided with a bottom ring left fixing through hole positioned at a lower end thereof, and a bottom ring left activity groove positioned at an upper end thereof, the bottom ring right fixing head is provided with a bottom ring right fixing through hole positioned at a lower end thereof, and a bottom ring activity groove positioned at an upper end thereof; wherein the left fastener is connected to the top ring left fixing head and the bottom ring left fixing head by passing through the top ring-right left fixing through hole, the top ring activity groove, the bottom ring left activity groove, and the bottom ring left fixing through hole; wherein the right fastener is connected to the top ring right fixing head and the bottom ring right fixing head by passing through the top ring right fixing through hole, top ring-left right activity groove, the bottom ring right activity groove and the bottom ring right fixing through hole, wherein the top ring left activity groove and the bottom ring left activity groove are configured to be sized to couple with the left bolt to allow movement of the left bolt, and wherein the top ring right activity groove and the bottom ring right activity groove are configured to couple with the right bolt to allow movement of the right bolt.

\* \* \* \* \*